(12) United States Patent
Schlebusch et al.

(10) Patent No.: US 12,478,775 B2
(45) Date of Patent: Nov. 25, 2025

(54) CARDIAC ASSIST SYSTEM, AND METHOD FOR MONITORING THE INTEGRITY OF A RETAINING STRUCTURE OF A CARDIAC ASSIST SYSTEM

(71) Applicant: KARDION GMBH, Stuttgart (DE)

(72) Inventors: Thomas Alexander Schlebusch, Renningen (DE); Ricardo Ehrenpfordt, Korntal-Münchingen (DE); Ahmad Mansour, Weil der Stadt (DE)

(73) Assignee: Kardion GmbH, Stuttgart (DE)

( * ) Notice: Subject to any disclaimer, the term of this patent is extended or adjusted under 35 U.S.C. 154(b) by 961 days.

(21) Appl. No.: 17/258,859

(22) PCT Filed: Jul. 9, 2019

(86) PCT No.: PCT/EP2019/068346
§ 371 (c)(1),
(2) Date: Aug. 27, 2021

(87) PCT Pub. No.: WO2020/011760
PCT Pub. Date: Jan. 16, 2020

(65) Prior Publication Data
US 2021/0379352 A1    Dec. 9, 2021

(30) Foreign Application Priority Data

Jul. 9, 2018 (DE) .......................... 102018211297.5

(51) Int. Cl.
*A61M 60/816* (2021.01)
*A61M 60/139* (2021.01)
(Continued)

(52) U.S. Cl.
CPC ........ *A61M 60/816* (2021.01); *A61M 60/861* (2021.01); *A61M 60/139* (2021.01);
(Continued)

(58) Field of Classification Search
CPC ............ A61M 60/139; A61M 2205/33; A61M 60/816; A61M 60/861; A61M 60/178;
(Continued)

(56) References Cited

U.S. PATENT DOCUMENTS 2,254,698 A    9/1941   Hansen, Jr.
2,310,923 A    2/1943   Bean
(Continued)

FOREIGN PATENT DOCUMENTS

AU    7993698       2/1999
AU    2002308409    12/2005
(Continued)

OTHER PUBLICATIONS

Park, Chan-Hee et al. 'A Novel Electrical Potential Sensing Method for in Vitro Stent Fracture Monitoring and Detection'. Jan. 1, 2011:213-222. (Year: 2011).*
(Continued)

*Primary Examiner* — Pamela M. Bays
*Assistant Examiner* — Christine Sison
(74) *Attorney, Agent, or Firm* — Knobbe, Martens, Olson & Bear, LLP

(57) ABSTRACT

A cardiac support system (20) is equipped with a retaining structure (30) for the cardiac support system, said retaining structure (30) being intended to fix the cardiac support system in place. The cardiac support system comprises a device for monitoring the integrity of the retaining structure (30).

22 Claims, 4 Drawing Sheets

(51) Int. Cl.
*A61M 60/178* (2021.01)
*A61M 60/216* (2021.01)
*A61M 60/861* (2021.01)

(52) U.S. Cl.
CPC ......... *A61M 60/178* (2021.01); *A61M 60/216* (2021.01); *A61M 2205/33* (2013.01)

(58) Field of Classification Search
CPC ................ A61M 60/216; A61M 60/13; A61M 2205/70; A61F 2/82; A61F 2/488
See application file for complete search history.

(56) References Cited

U.S. PATENT DOCUMENTS

| | | |
|---|---|---|
| 3,085,407 A | 4/1963 | Tomlinson |
| 3,505,987 A | 4/1970 | Heilman |
| 3,568,659 A | 3/1971 | Karnegis |
| 3,614,181 A | 10/1971 | Meeks |
| 3,747,998 A | 7/1973 | Klein et al. |
| 3,807,813 A | 4/1974 | Milligan |
| 3,995,617 A | 12/1976 | Watkins et al. |
| 4,115,040 A | 9/1978 | Knorr |
| 4,245,622 A | 1/1981 | Hutchins, IV |
| 4,471,252 A | 9/1984 | West |
| 4,522,194 A * | 6/1985 | Normann ............ A61M 60/497 604/920 |
| 4,625,712 A | 12/1986 | Wampler |
| 4,643,641 A | 2/1987 | Clausen et al. |
| 4,753,221 A | 6/1988 | Kensey et al. |
| 4,779,614 A | 10/1988 | Moise |
| 4,785,795 A | 11/1988 | Singh et al. |
| 4,802,650 A | 2/1989 | Stricker |
| 4,817,586 A | 4/1989 | Wampler |
| 4,846,152 A | 7/1989 | Wampler et al. |
| 4,888,011 A | 12/1989 | Kung et al. |
| 4,889,131 A | 12/1989 | Salem et al. |
| 4,895,557 A | 1/1990 | Moise et al. |
| 4,896,754 A | 1/1990 | Carlson et al. |
| 4,902,272 A | 2/1990 | Milder et al. |
| 4,908,012 A | 3/1990 | Moise et al. |
| 4,919,647 A | 4/1990 | Nash |
| 4,927,407 A | 5/1990 | Dorman |
| 4,943,275 A | 7/1990 | Stricker |
| 4,944,722 A | 7/1990 | Carriker et al. |
| 4,968,300 A | 11/1990 | Moutafis et al. |
| 4,971,768 A | 11/1990 | Ealba |
| 4,985,014 A | 1/1991 | Orejola |
| 5,044,897 A | 9/1991 | Dorman |
| 5,061,256 A | 10/1991 | Wampler |
| 5,084,064 A | 1/1992 | Barak et al. |
| 5,089,016 A | 2/1992 | Millner et al. |
| 5,090,957 A | 2/1992 | Moutafis et al. |
| 5,112,292 A | 5/1992 | Hwang et al. |
| 5,112,349 A | 5/1992 | Summers et al. |
| 5,116,305 A | 5/1992 | Milder et al. |
| 5,195,877 A | 3/1993 | Kletschka |
| 5,290,227 A | 3/1994 | Pasque |
| 5,297,940 A | 3/1994 | Buse |
| 5,313,765 A | 5/1994 | Martin |
| 5,322,509 A | 6/1994 | Center |
| 5,330,460 A | 7/1994 | Moss et al. |
| 5,344,443 A | 9/1994 | Palma et al. |
| 5,354,271 A | 10/1994 | Voda |
| 5,376,114 A | 12/1994 | Jarvik |
| 5,399,145 A | 3/1995 | Ito et al. |
| 5,405,383 A | 4/1995 | Barr |
| 5,409,463 A | 4/1995 | Thomas et al. |
| 5,443,503 A | 8/1995 | Yamane |
| 5,456,715 A | 10/1995 | Liotta |
| 5,527,159 A | 6/1996 | Bozeman, Jr. et al. |
| 5,599,173 A | 2/1997 | Chen et al. |
| 5,613,935 A | 3/1997 | Jarvik |
| 5,647,127 A | 7/1997 | Ltd |
| 5,695,471 A | 12/1997 | Wampler |
| 5,702,430 A | 12/1997 | Corp |
| 5,720,771 A | 2/1998 | Snell |
| 5,746,709 A | 5/1998 | Rom et al. |
| 5,749,855 A | 5/1998 | Reitan |
| 5,752,937 A | 5/1998 | Otten et al. |
| 5,752,976 A | 5/1998 | Duffin et al. |
| 5,766,207 A | 6/1998 | Potter et al. |
| 5,831,365 A | 11/1998 | Keim et al. |
| 5,888,241 A | 3/1999 | Jarvik |
| 5,888,242 A | 3/1999 | Antaki et al. |
| 5,904,646 A | 5/1999 | Jarvik |
| 5,911,685 A | 6/1999 | Siess et al. |
| 5,921,913 A | 7/1999 | Siess |
| 5,928,132 A | 7/1999 | Leschinsky |
| 5,964,694 A | 10/1999 | Siess et al. |
| 6,001,056 A | 12/1999 | Jassawalla et al. |
| 6,007,478 A | 12/1999 | Siess et al. |
| 6,018,208 A | 1/2000 | Maher et al. |
| 6,050,975 A | 4/2000 | Poirier |
| 6,071,093 A | 6/2000 | Hart |
| 6,116,862 A | 9/2000 | Rau et al. |
| 6,123,659 A | 9/2000 | le Blanc et al. |
| 6,135,710 A | 10/2000 | Araki et al. |
| 6,149,405 A | 11/2000 | Abe et al. |
| 6,152,909 A | 11/2000 | Bagaoisan |
| 6,155,969 A | 12/2000 | Schima et al. |
| 6,158,984 A | 12/2000 | Cao et al. |
| 6,159,198 A | 12/2000 | Gardeski et al. |
| 6,161,838 A | 12/2000 | Balsells |
| 6,176,848 B1 | 1/2001 | Rau et al. |
| 6,186,665 B1 | 2/2001 | Maher et al. |
| 6,210,318 B1 | 4/2001 | Lederman |
| 6,217,541 B1 | 4/2001 | Yu |
| 6,220,832 B1 | 4/2001 | Schob |
| 6,227,820 B1 | 5/2001 | Jarvik |
| 6,245,007 B1 | 6/2001 | Bedingham et al. |
| 6,254,359 B1 | 7/2001 | Aber |
| 6,264,205 B1 | 7/2001 | Balsells |
| 6,264,601 B1 | 7/2001 | Jassawalla et al. |
| 6,264,645 B1 | 7/2001 | Jonkman |
| 6,293,752 B1 | 9/2001 | Clague et al. |
| 6,351,048 B1 | 2/2002 | Schob et al. |
| 6,361,292 B1 | 3/2002 | Chang et al. |
| 6,432,136 B1 | 8/2002 | Weiss et al. |
| 6,445,956 B1 | 9/2002 | Laird et al. |
| 6,447,266 B2 | 9/2002 | Antaki et al. |
| 6,450,948 B1 | 9/2002 | Matsuura et al. |
| 6,497,681 B1 | 12/2002 | Brenner |
| 6,527,698 B1 | 3/2003 | Kung et al. |
| 6,530,876 B1 | 3/2003 | Spence |
| 6,533,716 B1 | 3/2003 | Schmitz-Rode et al. |
| 6,540,658 B1 | 4/2003 | Fasciano et al. |
| 6,544,216 B1 | 4/2003 | Sammler et al. |
| 6,544,247 B1 | 4/2003 | Gardeski et al. |
| 6,579,257 B1 | 6/2003 | Elgas et al. |
| 6,592,620 B1 | 7/2003 | Lancisi et al. |
| 6,595,743 B1 | 7/2003 | Kazatchkov et al. |
| 6,607,368 B1 | 8/2003 | Ross et al. |
| 6,623,475 B1 | 9/2003 | Siess |
| 6,719,791 B1 | 4/2004 | Nüsser et al. |
| 6,743,239 B1 | 6/2004 | Kuehn |
| 6,794,789 B2 | 9/2004 | Siess et al. |
| 6,841,910 B2 | 1/2005 | Gery |
| 6,879,126 B2 | 4/2005 | Paden et al. |
| 6,912,423 B2 | 6/2005 | Ley et al. |
| 6,942,611 B2 | 9/2005 | Siess |
| 6,949,066 B2 | 9/2005 | Bearnson et al. |
| 6,969,345 B2 | 11/2005 | Jassawalla et al. |
| 7,011,620 B1 | 3/2006 | Siess |
| 7,014,620 B2 | 3/2006 | Kim |
| 7,022,100 B1 | 4/2006 | Aboul-Hosn et al. |
| 7,027,875 B2 | 4/2006 | Siess et al. |
| 7,070,398 B2 | 7/2006 | Olsen et al. |
| 7,070,555 B2 | 7/2006 | Siess |
| 7,083,588 B1 | 8/2006 | Shmulewitz et al. |
| 7,144,364 B2 | 12/2006 | Barbut et al. |
| 7,160,243 B2 | 1/2007 | Medvedev |
| 7,166,088 B2 | 1/2007 | Heuser |
| 7,238,151 B2 | 7/2007 | Frazier |

(56) References Cited

U.S. PATENT DOCUMENTS

| | | |
|---|---|---|
| 7,241,257 B1 | 7/2007 | Ainsworth et al. |
| 7,250,041 B2 | 7/2007 | Chiu et al. |
| 7,264,606 B2 | 9/2007 | Jarvik et al. |
| 7,357,794 B2 | 4/2008 | Makower et al. |
| 7,393,181 B2 | 7/2008 | McBride et al. |
| 7,419,486 B2 | 9/2008 | Kampa |
| 7,462,019 B1 | 12/2008 | Allarie et al. |
| 7,479,102 B2 | 1/2009 | Jarvik |
| 7,502,648 B2 | 3/2009 | Okubo et al. |
| 7,621,894 B2 | 11/2009 | Leeflang et al. |
| 7,722,568 B2 | 5/2010 | Lenker et al. |
| 7,736,296 B2 | 6/2010 | Siess et al. |
| 7,744,571 B2 | 6/2010 | Fisher et al. |
| 7,762,941 B2 | 7/2010 | Jarvik |
| 7,798,952 B2 | 9/2010 | Tansley et al. |
| 7,824,375 B2 | 11/2010 | Hastings, Jr. et al. |
| 7,841,976 B2 | 11/2010 | McBride et al. |
| 7,850,593 B2 | 12/2010 | Vincent et al. |
| 7,878,967 B1 | 2/2011 | Khanal |
| 7,914,436 B1 | 3/2011 | Kung |
| 7,934,909 B2 | 5/2011 | Nuesser et al. |
| 7,951,119 B2 | 5/2011 | Leeflang et al. |
| 7,959,551 B2 | 6/2011 | Jarvik |
| 7,963,905 B2 | 6/2011 | Salmonsen et al. |
| 7,998,190 B2 | 8/2011 | Gharib et al. |
| 8,012,079 B2 | 9/2011 | Delgado, III |
| 8,025,647 B2 | 9/2011 | Siess et al. |
| 8,043,263 B2 | 10/2011 | Helgeson et al. |
| 8,075,472 B2 | 12/2011 | Zilbershlag et al. |
| 8,088,059 B2 | 1/2012 | Jarvik |
| 8,088,154 B2 | 1/2012 | Hoffman et al. |
| 8,114,008 B2 | 2/2012 | Hidaka et al. |
| 8,123,669 B2 | 2/2012 | Siess et al. |
| RE43,299 E | 4/2012 | Siess |
| 8,152,845 B2 | 4/2012 | Bourque |
| 8,157,719 B1 | 4/2012 | Ainsworth et al. |
| 8,177,703 B2 | 5/2012 | Smith et al. |
| 8,216,122 B2 | 7/2012 | Kung |
| 8,231,519 B2 | 7/2012 | Reichenbach et al. |
| 8,262,619 B2 | 9/2012 | Chebator et al. |
| 8,292,908 B2 | 10/2012 | Nieman et al. |
| 8,343,028 B2 | 1/2013 | Gregoric et al. |
| 8,371,997 B2 | 2/2013 | Shifflette |
| 8,376,926 B2 | 2/2013 | Benkowsi et al. |
| 8,382,695 B1 | 2/2013 | Patel |
| 8,382,830 B2 | 2/2013 | Maher et al. |
| 8,388,565 B2 | 3/2013 | Shifflette |
| 8,419,609 B2 | 4/2013 | Shambaugh, Jr. et al. |
| 8,449,443 B2 | 5/2013 | Rodefeld et al. |
| 8,475,431 B2 | 7/2013 | Howat |
| 8,480,555 B2 | 7/2013 | Kung |
| 8,480,627 B2 | 7/2013 | Christiansen |
| 8,485,961 B2 | 7/2013 | Campbell et al. |
| 8,512,012 B2 | 8/2013 | Akdis et al. |
| 8,535,211 B2 | 9/2013 | Campbell et al. |
| 8,545,380 B2 | 10/2013 | Farnan et al. |
| 8,562,508 B2 | 10/2013 | Dague et al. |
| 8,579,966 B2 | 11/2013 | Seguin et al. |
| 8,585,572 B2 | 11/2013 | Mehmanesh |
| 8,591,393 B2 | 11/2013 | Walters et al. |
| 8,591,538 B2 | 11/2013 | Gellman |
| 8,591,539 B2 | 11/2013 | Gellman |
| 8,597,170 B2 | 12/2013 | Walters et al. |
| 8,613,777 B2 | 12/2013 | Siess et al. |
| 8,617,239 B2 | 12/2013 | Reitan |
| 8,622,949 B2 | 1/2014 | Zafirelis et al. |
| 8,641,594 B2 | 2/2014 | LaRose et al. |
| 8,657,875 B2 | 2/2014 | Kung et al. |
| 8,684,362 B2 | 4/2014 | Balsells et al. |
| 8,684,904 B2 | 4/2014 | Campbell et al. |
| 8,690,749 B1 | 4/2014 | Nunez |
| 8,721,517 B2 | 5/2014 | Zeng et al. |
| 8,727,959 B2 | 5/2014 | Reitan et al. |
| 8,728,055 B2 | 5/2014 | Stehr et al. |
| 8,731,664 B2 | 5/2014 | Foster et al. |
| 8,734,331 B2 | 5/2014 | Evans et al. |
| 8,814,776 B2 | 8/2014 | Hastie et al. |
| 8,814,933 B2 | 8/2014 | Siess |
| 8,849,398 B2 | 9/2014 | Evans |
| 8,852,173 B2 | 10/2014 | Sigg et al. |
| 8,864,642 B2 | 10/2014 | Scheckel |
| 8,864,643 B2 | 10/2014 | Reichenbach et al. |
| 8,864,644 B2 | 10/2014 | Yomtov |
| 8,882,477 B2 | 11/2014 | Fritz, IV et al. |
| 8,888,728 B2 | 11/2014 | Aboul-Hosn et al. |
| 8,894,387 B2 | 11/2014 | White |
| 8,897,873 B2 | 11/2014 | Schima et al. |
| 8,900,060 B2 | 12/2014 | Liebing |
| 8,900,115 B2 | 12/2014 | Bolling et al. |
| 8,926,564 B2 | 1/2015 | King et al. |
| 8,932,246 B2 | 1/2015 | Ferrari |
| 8,992,406 B2 | 3/2015 | Corbett |
| 8,992,407 B2 | 3/2015 | Smith et al. |
| 9,028,216 B2 | 5/2015 | Schumacher et al. |
| 9,028,392 B2 | 5/2015 | Shifflette |
| 9,033,863 B2 | 5/2015 | Jarvik |
| 9,091,271 B2 | 7/2015 | Bourque |
| 9,138,518 B2 | 9/2015 | Campbell et al. |
| 9,144,638 B2 | 9/2015 | Zimmermann et al. |
| 9,144,669 B2 | 9/2015 | Wieselthaler |
| 9,149,606 B2 | 10/2015 | Beissel et al. |
| 9,162,017 B2 | 10/2015 | Evans et al. |
| 9,168,060 B2 | 10/2015 | Voss |
| 9,192,705 B2 | 11/2015 | Yanai et al. |
| 9,199,020 B2 | 12/2015 | Siess |
| 9,265,870 B2 | 2/2016 | Reichenbach et al. |
| 9,297,735 B2 | 3/2016 | Graichen et al. |
| 9,308,305 B2 | 4/2016 | Chen et al. |
| 9,314,556 B2 | 4/2016 | Tuseth |
| 9,327,067 B2 | 5/2016 | Zeng et al. |
| 9,327,068 B2 | 5/2016 | Aboul-Hosn et al. |
| 9,345,824 B2 | 5/2016 | Mohl et al. |
| 9,364,592 B2 | 6/2016 | McBride |
| 9,370,613 B2 | 6/2016 | Hsu et al. |
| 9,371,826 B2 | 6/2016 | Yanai et al. |
| 9,381,286 B2 | 7/2016 | Spence et al. |
| 9,402,942 B2 | 8/2016 | Hastie et al. |
| 9,421,311 B2 | 8/2016 | Tanner et al. |
| 9,433,713 B2 | 9/2016 | Corbett et al. |
| 9,440,013 B2 | 9/2016 | Dowling et al. |
| 9,452,249 B2 | 9/2016 | Kearsley et al. |
| 9,474,840 B2 | 10/2016 | Siess |
| 9,486,566 B2 | 11/2016 | Siess |
| 9,492,601 B2 | 11/2016 | Casas et al. |
| 9,510,813 B2 | 12/2016 | Levy et al. |
| 9,533,084 B2 | 1/2017 | Siess et al. |
| 9,539,094 B2 | 1/2017 | Dale et al. |
| 9,539,378 B2 | 1/2017 | Tuseth |
| 9,545,468 B2 | 1/2017 | Aboul-Hosn et al. |
| 9,550,017 B2 | 1/2017 | Spanier et al. |
| 9,555,173 B2 | 1/2017 | Spanier |
| 9,555,175 B2 | 1/2017 | Bulent et al. |
| 9,556,873 B2 | 1/2017 | Yanai et al. |
| 9,561,313 B2 | 2/2017 | Taskin |
| 9,561,314 B2 | 2/2017 | Aboul-Hosn et al. |
| 9,569,985 B2 | 2/2017 | Alkhatib et al. |
| 9,579,433 B2 | 2/2017 | LaRose et al. |
| 9,585,991 B2 | 3/2017 | Spence |
| 9,592,397 B2 | 3/2017 | Hansen et al. |
| 9,597,063 B2 | 3/2017 | Voss et al. |
| 9,616,157 B2 | 4/2017 | Akdis |
| 9,616,159 B2 | 4/2017 | Anderson et al. |
| 9,623,162 B2 | 4/2017 | Graham et al. |
| 9,623,163 B1 | 4/2017 | Fischi |
| 9,636,442 B2 | 5/2017 | Karmon et al. |
| 9,656,011 B2 | 5/2017 | Graham et al. |
| 9,669,144 B2 | 6/2017 | Spanier et al. |
| 9,675,738 B2 | 6/2017 | Tanner et al. |
| 9,675,739 B2 | 6/2017 | Tanner et al. |
| 9,675,740 B2 | 6/2017 | Zeng et al. |
| 9,682,180 B2 | 6/2017 | Hoarau et al. |
| 9,717,833 B2 | 8/2017 | McBride et al. |
| 9,724,083 B2 | 8/2017 | Quadri et al. |
| 9,731,058 B2 | 8/2017 | Siebenhaar et al. |

(56) References Cited

U.S. PATENT DOCUMENTS

| | | |
|---|---|---|
| 9,744,279 B2 | 8/2017 | Tamez et al. |
| 9,750,861 B2 | 9/2017 | Hastie et al. |
| 9,759,222 B2 | 9/2017 | Zimmermann et al. |
| 9,769,912 B2 | 9/2017 | Helm et al. |
| 9,770,543 B2 | 9/2017 | Tanner et al. |
| 9,782,905 B2 | 10/2017 | Drake et al. |
| 9,789,238 B2 | 10/2017 | Aboul-Hosn et al. |
| 9,801,990 B2 | 10/2017 | Lynch |
| 9,807,860 B2 | 10/2017 | Helm et al. |
| 9,814,813 B2 | 11/2017 | Corbett |
| 9,814,814 B2 | 11/2017 | Corbett et al. |
| 9,821,100 B2 | 11/2017 | Corbett et al. |
| 9,821,101 B2 | 11/2017 | Andrus et al. |
| 9,821,146 B2 | 11/2017 | Tao et al. |
| 9,827,356 B2 | 11/2017 | Muller et al. |
| 9,833,550 B2 | 12/2017 | Siess |
| 9,849,223 B2 | 12/2017 | LaRose |
| 9,872,948 B2 | 1/2018 | Siess |
| 9,878,087 B2 | 1/2018 | Richardson et al. |
| 9,907,890 B2 | 3/2018 | Muller |
| 9,919,087 B2 | 3/2018 | Pfeffer et al. |
| 9,950,101 B2 | 4/2018 | Smith et al. |
| 9,968,719 B2 | 5/2018 | Colella |
| 9,974,893 B2 | 5/2018 | Toellner |
| 9,974,938 B2 | 5/2018 | Pepin et al. |
| 9,999,714 B2 | 6/2018 | Spanier et al. |
| 10,010,412 B2 | 7/2018 | Taft |
| 10,029,037 B2 | 7/2018 | Muller et al. |
| 10,080,871 B2 | 9/2018 | Schumacher et al. |
| 10,123,875 B2 | 11/2018 | Wildhirt et al. |
| 10,124,102 B2 | 11/2018 | Bulent et al. |
| 10,130,742 B2 | 11/2018 | Tuseth |
| 10,149,932 B2 | 12/2018 | McBride et al. |
| 10,179,197 B2 | 1/2019 | Kaiser et al. |
| 10,183,104 B2 | 1/2019 | Anderson et al. |
| 10,201,645 B2 | 2/2019 | Muller |
| 10,207,037 B2 | 2/2019 | Corbett et al. |
| 10,207,038 B2 | 2/2019 | Neumann |
| 10,220,129 B2 | 3/2019 | Ayre et al. |
| 10,232,099 B2 | 3/2019 | Peters et al. |
| 10,238,782 B2 | 3/2019 | Barry |
| 10,238,783 B2 | 3/2019 | Aboul-Hosn et al. |
| 10,251,986 B2 | 4/2019 | Larose et al. |
| 10,258,771 B2 | 4/2019 | Beissel et al. |
| 10,279,093 B2 | 5/2019 | Reichenbach et al. |
| 10,293,090 B2 | 5/2019 | Bonde et al. |
| 10,300,185 B2 | 5/2019 | Aboul-Hosn et al. |
| 10,300,249 B2 | 5/2019 | Tao et al. |
| 10,322,217 B2 | 6/2019 | Spence |
| 10,342,906 B2 | 7/2019 | D'Ambrosio et al. |
| 10,350,384 B2 | 7/2019 | Farnan et al. |
| 10,357,598 B2 | 7/2019 | Aboul-Hosn et al. |
| 10,361,617 B2 | 7/2019 | Mueller et al. |
| 10,371,150 B2 | 8/2019 | Wu et al. |
| 10,376,162 B2 | 8/2019 | Edelman et al. |
| 10,420,869 B2 | 9/2019 | Cornen |
| 10,434,232 B2 | 10/2019 | Wu et al. |
| 10,441,771 B2 | 10/2019 | Bickhart et al. |
| 10,449,275 B2 | 10/2019 | Corbett |
| 10,449,279 B2 | 10/2019 | Muller |
| 10,478,538 B2 | 11/2019 | Scheckel et al. |
| 10,478,539 B2 | 11/2019 | Pfeffer et al. |
| 10,478,542 B2 | 11/2019 | Jahangir |
| 10,493,191 B2 | 12/2019 | Whisenant et al. |
| 10,500,323 B2 | 12/2019 | Heuring et al. |
| 10,512,537 B2 | 12/2019 | Corbett et al. |
| 10,525,178 B2 | 1/2020 | Zeng |
| 10,537,431 B2 | 1/2020 | Zhou et al. |
| 10,537,670 B2 | 1/2020 | Tuseth et al. |
| 10,537,672 B2 | 1/2020 | Tuseth et al. |
| 10,557,475 B2 | 2/2020 | Roehn |
| 10,561,771 B2 | 2/2020 | Heilman et al. |
| 10,561,772 B2 | 2/2020 | Schumacher |
| 10,576,191 B2 | 3/2020 | LaRose |
| 10,576,192 B2 | 3/2020 | Muller et al. |
| 10,576,258 B2 | 3/2020 | Fantuzzi et al. |
| 10,584,589 B2 | 3/2020 | Schumacher et al. |
| 10,589,012 B2 | 3/2020 | Toellner et al. |
| 10,589,013 B2 | 3/2020 | Bourque |
| 10,610,626 B2 | 4/2020 | Spanier et al. |
| 10,617,808 B2 | 4/2020 | Hastie et al. |
| 10,632,241 B2 | 4/2020 | Schenck et al. |
| 10,660,998 B2 | 5/2020 | Hodges |
| 10,662,967 B2 | 5/2020 | Scheckel |
| 10,668,195 B2 | 6/2020 | Flores |
| 10,669,855 B2 | 6/2020 | Toellner et al. |
| 10,709,828 B2 | 7/2020 | Toellner et al. |
| 10,722,631 B2 | 7/2020 | Salahieh et al. |
| 10,737,008 B2 | 8/2020 | Corbett et al. |
| 10,737,086 B2 | 8/2020 | Agrawal et al. |
| 10,773,002 B2 | 9/2020 | Siess et al. |
| 10,806,904 B2 | 10/2020 | Jelle et al. |
| 10,814,053 B2 | 10/2020 | Throckmorton et al. |
| 10,857,273 B2 | 12/2020 | Hodges et al. |
| 10,864,015 B2 | 12/2020 | Von Segesser |
| 10,864,308 B2 | 12/2020 | Muller et al. |
| 10,881,836 B2 | 1/2021 | Schumacher et al. |
| 10,881,845 B2 | 1/2021 | Siess et al. |
| 10,894,143 B2 | 1/2021 | Yokoyama |
| 10,898,625 B2 | 1/2021 | Toellner |
| 10,953,205 B2 | 3/2021 | Korkuch |
| 10,959,878 B2 | 3/2021 | Wolfertz et al. |
| 10,967,152 B2 | 4/2021 | Korkuch |
| 11,007,350 B2 | 5/2021 | Tao et al. |
| 11,027,114 B2 | 6/2021 | D'Ambrosio et al. |
| 11,033,729 B2 | 6/2021 | Scheckel et al. |
| 11,045,624 B2 | 6/2021 | Oiwa |
| 11,045,634 B2 | 6/2021 | Korkuch et al. |
| 11,045,638 B2 | 6/2021 | Keenan et al. |
| 11,058,851 B2 | 7/2021 | Farnan |
| 11,058,863 B2 | 7/2021 | Demou |
| 11,058,865 B2 | 7/2021 | Fitzgerald et al. |
| 11,065,417 B2 | 7/2021 | Inukai et al. |
| 11,065,434 B2 | 7/2021 | Egler et al. |
| 11,076,884 B2 | 8/2021 | Anderson et al. |
| 11,090,465 B2 | 8/2021 | Weber et al. |
| 11,092,158 B2 | 8/2021 | Siess et al. |
| 11,096,568 B2 | 8/2021 | Harrah et al. |
| 11,097,092 B2 | 8/2021 | Siess et al. |
| 11,103,689 B2 | 8/2021 | Siess et al. |
| 11,103,690 B2 | 8/2021 | Epple |
| 11,107,626 B2 | 8/2021 | Siess et al. |
| 11,123,538 B2 | 9/2021 | Epple et al. |
| 11,123,539 B2 | 9/2021 | Pfeffer et al. |
| 11,123,541 B2 | 9/2021 | Corbett et al. |
| 11,129,959 B2 | 9/2021 | Hart et al. |
| 11,129,969 B2 | 9/2021 | Pederson, Jr. et al. |
| 11,129,978 B2 | 9/2021 | Pfeffer et al. |
| 11,141,579 B2 | 10/2021 | Steingräber |
| 11,160,970 B2 | 11/2021 | Muller et al. |
| 11,167,124 B2 | 11/2021 | Pfeffer et al. |
| 11,173,295 B2 | 11/2021 | Mack et al. |
| 11,173,297 B2 | 11/2021 | Muller |
| 11,179,557 B2 | 11/2021 | Georges et al. |
| 11,185,678 B2 | 11/2021 | Smith et al. |
| 11,185,680 B2 | 11/2021 | Tuval et al. |
| 11,191,927 B2 | 12/2021 | McLaughlin et al. |
| 11,191,944 B2 | 12/2021 | Tuval et al. |
| 11,197,690 B2 | 12/2021 | Fantuzzi et al. |
| 11,197,989 B2 | 12/2021 | Arslan et al. |
| 11,202,901 B2 | 12/2021 | Barry |
| 11,219,755 B2 | 1/2022 | Siess et al. |
| 11,219,756 B2 | 1/2022 | Tanner et al. |
| 11,229,786 B2 | 1/2022 | Zeng et al. |
| 11,235,138 B2 | 2/2022 | Gross-Hardt et al. |
| 11,235,140 B2 | 2/2022 | Siess et al. |
| 11,241,312 B2 | 2/2022 | Simonin |
| 11,241,568 B2 | 2/2022 | Keenan et al. |
| 11,241,569 B2 | 2/2022 | Delgado, III |
| 11,253,693 B2 | 2/2022 | Pfeffer et al. |
| 11,260,212 B2 | 3/2022 | Tuval et al. |
| 11,260,213 B2 | 3/2022 | Zeng et al. |
| 11,260,215 B2 | 3/2022 | Scheckel et al. |
| 11,273,300 B2 | 3/2022 | Schafir |

(56) References Cited

U.S. PATENT DOCUMENTS

| | | |
|---|---|---|
| 11,273,301 B2 | 3/2022 | Pfeffer et al. |
| 11,278,711 B2 | 3/2022 | Liebing |
| 11,280,345 B2 | 3/2022 | Bredenbreuker et al. |
| 11,285,309 B2 | 3/2022 | Tuval et al. |
| 11,291,800 B2 | 4/2022 | Yokota |
| 11,291,805 B2 | 4/2022 | Ouchi et al. |
| 11,291,821 B2 | 4/2022 | Agrawal et al. |
| 11,291,824 B2 | 4/2022 | Schwammenthal et al. |
| 11,291,825 B2 | 4/2022 | Tuval et al. |
| 11,291,826 B2 | 4/2022 | Tuval et al. |
| 11,291,855 B2 | 4/2022 | Wiesener |
| 11,298,519 B2 | 4/2022 | Josephy et al. |
| 11,298,520 B2 | 4/2022 | Schwammenthal et al. |
| 11,298,521 B2 | 4/2022 | Schwammenthal et al. |
| 11,298,523 B2 | 4/2022 | Tuval et al. |
| 11,298,524 B2 | 4/2022 | El Katerji et al. |
| 11,298,525 B2 | 4/2022 | Jahangir |
| 11,304,747 B2 | 4/2022 | Simani et al. |
| 11,304,755 B2 | 4/2022 | Cao et al. |
| 11,305,103 B2 | 4/2022 | Larose et al. |
| 11,305,105 B2 | 4/2022 | Corbett et al. |
| 11,311,311 B2 | 4/2022 | Sperry et al. |
| 11,311,711 B2 | 4/2022 | Casas et al. |
| 11,311,712 B2 | 4/2022 | Zeng et al. |
| 11,313,228 B2 | 4/2022 | Schumacher et al. |
| D951,435 S | 5/2022 | Motomura et al. |
| 11,318,284 B2 | 5/2022 | Ishida et al. |
| 11,318,285 B2 | 5/2022 | Ishida |
| 11,318,290 B2 | 5/2022 | Kleinhaus |
| 11,318,295 B2 | 5/2022 | Reyes et al. |
| 11,324,920 B2 | 5/2022 | Inukai et al. |
| 11,324,940 B2 | 5/2022 | Earles et al. |
| 11,324,941 B2 | 5/2022 | Xu et al. |
| 11,331,082 B2 | 5/2022 | Itoh et al. |
| 11,331,450 B2 | 5/2022 | Sakaguchi |
| 11,331,451 B2 | 5/2022 | Yamashita et al. |
| 11,331,465 B2 | 5/2022 | Epple |
| 11,331,466 B2 | 5/2022 | Keen et al. |
| 11,331,467 B2 | 5/2022 | King et al. |
| 11,331,470 B2 | 5/2022 | Muller et al. |
| 11,338,124 B2 | 5/2022 | Pfeffer et al. |
| 11,338,125 B2 | 5/2022 | Liu et al. |
| 11,344,716 B2 | 5/2022 | Taskin |
| 11,344,717 B2 | 5/2022 | Kallenbach et al. |
| 11,351,356 B2 | 6/2022 | Mohl |
| 11,351,357 B2 | 6/2022 | Mohl |
| 11,351,359 B2 | 6/2022 | Clifton et al. |
| 11,357,967 B2 | 6/2022 | Zeng et al. |
| 11,364,363 B2 | 6/2022 | Fantuzzi et al. |
| 11,364,373 B2 | 6/2022 | Corbett et al. |
| 11,368,081 B2 | 6/2022 | Vogt et al. |
| 11,369,413 B2 | 6/2022 | Murphy |
| 11,369,785 B2 | 6/2022 | Callaway et al. |
| 11,369,786 B2 | 6/2022 | Menon et al. |
| 11,376,415 B2 | 7/2022 | Mohl |
| 11,377,512 B2 | 7/2022 | Kuramoto et al. |
| 11,389,633 B2 | 7/2022 | Rohl et al. |
| 11,389,639 B2 | 7/2022 | Casas |
| 11,389,641 B2 | 7/2022 | Nguyen et al. |
| 11,400,261 B2 | 8/2022 | Mathews et al. |
| 11,406,395 B2 | 8/2022 | Wada et al. |
| 11,406,522 B2 | 8/2022 | Folan et al. |
| 11,406,798 B2 | 8/2022 | Kambara |
| 11,406,799 B2 | 8/2022 | McEvaddy et al. |
| 11,413,443 B2 | 8/2022 | Hodges et al. |
| 11,413,446 B2 | 8/2022 | Siess et al. |
| 11,415,150 B2 | 8/2022 | Richert et al. |
| 11,419,721 B2 | 8/2022 | Poppe et al. |
| 11,419,743 B2 | 8/2022 | Poppe et al. |
| 11,421,701 B2 | 8/2022 | Schumacher et al. |
| 11,426,562 B2 | 8/2022 | Fantuzzi |
| 11,428,236 B2 | 8/2022 | McBride et al. |
| 11,433,168 B2 | 9/2022 | Wu et al. |
| 11,434,921 B2 | 9/2022 | McBride et al. |
| 11,434,922 B2 | 9/2022 | Roehn |
| 11,439,791 B2 | 9/2022 | Ishida |
| 11,446,044 B2 | 9/2022 | Bonnette et al. |
| 11,446,414 B2 | 9/2022 | Oiwa |
| 11,446,481 B2 | 9/2022 | Wolman et al. |
| 11,446,482 B2 | 9/2022 | Kirchhoff et al. |
| 11,452,575 B2 | 9/2022 | Morey et al. |
| 11,452,859 B2 | 9/2022 | Earles et al. |
| 11,458,285 B2 | 10/2022 | Graham et al. |
| 11,460,030 B2 | 10/2022 | Shambaugh et al. |
| 11,471,026 B2 | 10/2022 | Piskun et al. |
| 11,471,662 B2 | 10/2022 | Akkerman et al. |
| 11,471,663 B2 | 10/2022 | Tuval et al. |
| 11,471,665 B2 | 10/2022 | Clifton et al. |
| 11,478,627 B2 | 10/2022 | Siess et al. |
| 11,478,628 B2 | 10/2022 | Muller et al. |
| 11,478,629 B2 | 10/2022 | Harjes et al. |
| 11,484,698 B2 | 11/2022 | Radman |
| 11,484,699 B2 | 11/2022 | Tuval et al. |
| 11,486,400 B2 | 11/2022 | Schumacher |
| 11,491,320 B2 | 11/2022 | Siess |
| 11,491,322 B2 | 11/2022 | Muller et al. |
| 11,497,889 B2 | 11/2022 | Mixter et al. |
| 11,497,894 B2 | 11/2022 | Korkuch et al. |
| 11,497,896 B2 | 11/2022 | Tanner et al. |
| 11,497,906 B2 | 11/2022 | Grace et al. |
| 11,503,993 B2 | 11/2022 | Chu et al. |
| 11,504,102 B2 | 11/2022 | Stanton et al. |
| 11,511,083 B2 | 11/2022 | Wada |
| 11,511,084 B2 | 11/2022 | Chu |
| 11,511,098 B2 | 11/2022 | Agrawal et al. |
| 11,511,101 B2 | 11/2022 | Hastie et al. |
| 11,511,103 B2 | 11/2022 | Salahieh et al. |
| 11,511,104 B2 | 11/2022 | Dur et al. |
| 11,517,191 B2 | 12/2022 | Oskin |
| 11,517,720 B2 | 12/2022 | Korkuch et al. |
| 11,517,726 B2 | 12/2022 | Siess et al. |
| 11,517,736 B2 | 12/2022 | Earles et al. |
| 11,517,737 B2 | 12/2022 | Struthers et al. |
| 11,517,738 B2 | 12/2022 | Wisniewski |
| 11,517,739 B2 | 12/2022 | Toellner |
| 11,517,740 B2 | 12/2022 | Agarwa et al. |
| 11,523,905 B2 | 12/2022 | Griswold et al. |
| 11,524,137 B2 | 12/2022 | Jahangir |
| 11,524,165 B2 | 12/2022 | Tan et al. |
| 11,529,062 B2 | 12/2022 | Moyer et al. |
| 11,529,510 B2 | 12/2022 | Leven |
| 11,534,596 B2 | 12/2022 | Schafir et al. |
| 11,540,857 B2 | 1/2023 | Olson et al. |
| 11,564,710 B2 | 1/2023 | Fitterer et al. |
| 11,565,093 B2 | 1/2023 | Kirt et al. |
| 11,565,103 B2 | 1/2023 | Farago et al. |
| 11,569,015 B2 | 1/2023 | Mourran et al. |
| 11,572,879 B2 | 2/2023 | Mohl |
| 11,577,067 B2 | 2/2023 | Breidall et al. |
| 11,577,068 B2 | 2/2023 | Spence et al. |
| 11,583,659 B2 | 2/2023 | Pfeffer et al. |
| 11,583,670 B2 | 2/2023 | Pfeifer et al. |
| 11,583,671 B2 | 2/2023 | Nguyen et al. |
| 11,583,672 B2 | 2/2023 | Weber et al. |
| 11,590,336 B2 | 2/2023 | Harjes et al. |
| 11,590,337 B2 | 2/2023 | Granegger et al. |
| 11,590,338 B2 | 2/2023 | Barry |
| 11,592,028 B2 | 2/2023 | Schumacher et al. |
| 11,596,727 B2 | 3/2023 | Siess et al. |
| 11,602,448 B2 | 3/2023 | Nygaard et al. |
| 11,602,627 B2 | 3/2023 | Leonhardt |
| 11,617,876 B2 | 4/2023 | Scheckel et al. |
| 11,628,280 B2 | 4/2023 | Schumacher et al. |
| 11,628,293 B2 | 4/2023 | Gandhi et al. |
| 11,632,015 B2 | 4/2023 | Sconzert et al. |
| 11,633,574 B2 | 4/2023 | Watanabe |
| 11,633,586 B2 | 4/2023 | Tanner et al. |
| 11,638,813 B2 | 5/2023 | West |
| 11,639,722 B2 | 5/2023 | Medvedev et al. |
| 11,642,511 B2 | 5/2023 | Delgado, III |
| 11,648,387 B2 | 5/2023 | Schwammenthal et al. |
| 11,648,388 B2 | 5/2023 | Siess et al. |
| 11,648,389 B2 | 5/2023 | Wang et al. |
| 11,648,390 B2 | 5/2023 | Spanier et al. |

(56) References Cited

U.S. PATENT DOCUMENTS

| | | |
|---|---|---|
| 11,648,391 B2 | 5/2023 | Schwammenthal et al. |
| 11,648,392 B2 | 5/2023 | Tuval et al. |
| 11,648,393 B2 | 5/2023 | Taskin et al. |
| 11,654,273 B2 | 5/2023 | Granegger et al. |
| 11,654,275 B2 | 5/2023 | Brandt |
| 11,654,276 B2 | 5/2023 | Fitzgerald et al. |
| 11,660,434 B2 | 5/2023 | Korkuch et al. |
| 11,660,441 B2 | 5/2023 | Fitzgerald et al. |
| 11,666,747 B2 | 6/2023 | Tuval et al. |
| 11,666,748 B2 | 6/2023 | Kronstedt et al. |
| 11,668,321 B2 | 6/2023 | Richert et al. |
| 11,674,517 B2 | 6/2023 | Mohl |
| 11,679,234 B2 | 6/2023 | King et al. |
| 11,679,249 B2 | 6/2023 | Scheckel et al. |
| 11,684,275 B2 | 6/2023 | Tuval et al. |
| 11,684,769 B2 | 6/2023 | Harjes et al. |
| 11,690,521 B2 | 7/2023 | Tuval et al. |
| 11,690,606 B2 | 7/2023 | Muller et al. |
| 11,690,979 B2 | 7/2023 | Voss et al. |
| 11,690,996 B2 | 7/2023 | Siess et al. |
| 11,690,997 B2 | 7/2023 | Georges et al. |
| 11,697,002 B2 | 7/2023 | Korkuch |
| 11,697,016 B2 | 7/2023 | Epple |
| 11,701,510 B2 | 7/2023 | Demou |
| 11,702,938 B2 | 7/2023 | Schumacher et al. |
| 11,703,064 B2 | 7/2023 | Bredenbreuker et al. |
| 11,708,833 B2 | 7/2023 | McBride et al. |
| 11,730,939 B2 | 8/2023 | Siess et al. |
| 11,730,942 B2 | 8/2023 | Fantuzzi et al. |
| D998,799 S | 9/2023 | Okamura et al. |
| 11,744,567 B2 | 9/2023 | Deuel et al. |
| 11,744,638 B2 | 9/2023 | Davies et al. |
| 11,744,987 B2 | 9/2023 | Siess et al. |
| 11,745,005 B2 | 9/2023 | Delgado, III |
| 11,746,906 B1 | 9/2023 | Balta et al. |
| 11,751,751 B2 | 9/2023 | Calabrese et al. |
| 11,751,753 B2 | 9/2023 | Levasseur et al. |
| 11,752,308 B2 | 9/2023 | Tao et al. |
| 11,752,322 B2 | 9/2023 | Aboulhosn et al. |
| 11,752,323 B2 | 9/2023 | Edwards et al. |
| 11,754,075 B2 | 9/2023 | Schuelke et al. |
| 11,754,077 B1 | 9/2023 | Mohl |
| 11,759,610 B2 | 9/2023 | Calabrese et al. |
| 11,759,612 B2 | 9/2023 | Tanner et al. |
| 11,759,622 B2 | 9/2023 | Siess et al. |
| 11,766,264 B2 | 9/2023 | Phan et al. |
| 11,766,555 B2 | 9/2023 | Matthes et al. |
| 11,771,444 B2 | 10/2023 | Crawford et al. |
| 11,771,884 B2 | 10/2023 | Siess et al. |
| 11,771,885 B2 | 10/2023 | Liu et al. |
| 11,779,194 B2 | 10/2023 | Wilder et al. |
| 11,779,234 B2 | 10/2023 | Harjes et al. |
| 11,779,338 B2 | 10/2023 | Gordon et al. |
| 11,779,361 B2 | 10/2023 | Kugler et al. |
| 11,779,729 B2 | 10/2023 | Guimaraes et al. |
| 11,779,743 B2 | 10/2023 | Agrawal et al. |
| 11,779,751 B2 | 10/2023 | Earles et al. |
| 11,781,550 B2 | 10/2023 | Siess et al. |
| 11,786,109 B2 | 10/2023 | Golden et al. |
| 11,786,386 B2 | 10/2023 | Brady et al. |
| 11,786,700 B2 | 10/2023 | Pfeffer et al. |
| 11,786,701 B2 | 10/2023 | Maki et al. |
| 11,786,720 B2 | 10/2023 | Muller |
| 11,793,530 B2 | 10/2023 | Chu et al. |
| 11,793,977 B2 | 10/2023 | Korkuch et al. |
| 11,793,994 B2 | 10/2023 | Josephy et al. |
| 11,804,767 B2 | 10/2023 | Vogt et al. |
| 11,806,046 B2 | 11/2023 | Fantuzzi et al. |
| 11,806,116 B2 | 11/2023 | Tuval et al. |
| 11,806,117 B2 | 11/2023 | Tuval et al. |
| 11,806,258 B2 | 11/2023 | Hingston et al. |
| 11,806,517 B2 | 11/2023 | Petersen |
| 11,806,518 B2 | 11/2023 | Michelena et al. |
| 11,812,944 B2 | 11/2023 | Wales et al. |
| 11,812,951 B2 | 11/2023 | Mitelberg et al. |
| 11,812,952 B2 | 11/2023 | Abbott et al. |
| 11,813,183 B2 | 11/2023 | Christakis et al. |
| 11,813,443 B2 | 11/2023 | Hanson et al. |
| 11,813,444 B2 | 11/2023 | Siess et al. |
| 11,819,678 B2 | 11/2023 | Siess et al. |
| 11,826,127 B2 | 11/2023 | Casas |
| 11,826,517 B2 | 11/2023 | Fuller et al. |
| 11,832,793 B2 | 12/2023 | McWeeney et al. |
| 11,832,868 B2 | 12/2023 | Smail et al. |
| 11,833,278 B2 | 12/2023 | Siess et al. |
| 11,833,314 B2 | 12/2023 | Corbett et al. |
| 11,833,316 B2 | 12/2023 | Hayakawa et al. |
| 11,833,342 B2 | 12/2023 | Tanner et al. |
| 11,839,754 B2 | 12/2023 | Tuval et al. |
| 11,844,592 B2 | 12/2023 | Tuval et al. |
| 11,844,909 B2 | 12/2023 | Tassoni et al. |
| 11,844,940 B2 | 12/2023 | D'Ambrosio et al. |
| 11,850,373 B2 | 12/2023 | Golden et al. |
| 11,850,412 B2 | 12/2023 | Grauwinkel et al. |
| 11,850,413 B2 | 12/2023 | Zeng et al. |
| 11,850,414 B2 | 12/2023 | Schenck et al. |
| 11,850,415 B2 | 12/2023 | Schwammenthal et al. |
| 11,857,159 B2 | 1/2024 | Saenz Villalobos et al. |
| 11,857,161 B2 | 1/2024 | Nguyen et al. |
| 11,857,197 B2 | 1/2024 | Alexander et al. |
| 11,857,740 B2 | 1/2024 | Chu |
| 11,857,743 B2 | 1/2024 | Fantuzzi et al. |
| 11,857,777 B2 | 1/2024 | Earles et al. |
| 11,864,746 B2 | 1/2024 | Melilli et al. |
| 11,865,238 B2 | 1/2024 | Siess et al. |
| 11,865,275 B2 | 1/2024 | O'Carrol et al. |
| 11,871,962 B2 | 1/2024 | Tehrani et al. |
| 11,872,384 B2 | 1/2024 | Cotter |
| 11,877,753 B2 | 1/2024 | Connolly et al. |
| 11,878,131 B2 | 1/2024 | Pedersen et al. |
| 11,883,005 B2 | 1/2024 | Golden et al. |
| 11,883,062 B2 | 1/2024 | Rawson |
| 11,883,207 B2 | 1/2024 | El Katerji et al. |
| 11,883,274 B2 | 1/2024 | Schwammenthal et al. |
| 11,883,310 B2 | 1/2024 | Nolan et al. |
| 11,883,641 B2 | 1/2024 | Dur et al. |
| D1,015,536 S | 2/2024 | Walsh |
| 11,890,085 B2 | 2/2024 | Duval et al. |
| 11,890,212 B2 | 2/2024 | Gilmartin et al. |
| 11,890,428 B2 | 2/2024 | Ito |
| 11,890,435 B2 | 2/2024 | Takagi |
| 11,896,474 B2 | 2/2024 | Hynes et al. |
| 11,896,482 B2 | 2/2024 | Delaloye et al. |
| 11,896,814 B2 | 2/2024 | Shambaugh, Jr. |
| 11,898,642 B2 | 2/2024 | Stanton et al. |
| 11,903,589 B2 | 2/2024 | Stahman et al. |
| 11,903,600 B2 | 2/2024 | Chu et al. |
| 11,903,831 B2 | 2/2024 | Shuey et al. |
| 11,903,857 B2 | 2/2024 | Folan |
| 11,904,104 B2 | 2/2024 | Jahangir |
| 11,911,072 B2 | 2/2024 | Fantuzzi et al. |
| 11,911,305 B2 | 2/2024 | Smith et al. |
| 11,911,579 B2 | 2/2024 | Tanner et al. |
| 11,918,186 B2 | 3/2024 | Chu et al. |
| 11,918,187 B2 | 3/2024 | Cahill et al. |
| 11,918,202 B2 | 3/2024 | Deuel et al. |
| 11,918,219 B2 | 3/2024 | Smith et al. |
| 11,918,470 B2 | 3/2024 | Jarral et al. |
| 11,918,496 B2 | 3/2024 | Folan |
| 11,918,726 B2 | 3/2024 | Siess et al. |
| 11,918,752 B2 | 3/2024 | Tassoni et al. |
| 11,918,764 B2 | 3/2024 | Soltis et al. |
| 11,918,780 B2 | 3/2024 | Jagelski et al. |
| 11,918,800 B2 | 3/2024 | Muller et al. |
| 11,925,315 B2 | 3/2024 | Chu et al. |
| 11,925,356 B2 | 3/2024 | Anderson et al. |
| 11,925,383 B2 | 3/2024 | Tada et al. |
| 11,925,386 B2 | 3/2024 | Favreau |
| 11,925,570 B2 | 3/2024 | Lydecker et al. |
| 11,925,794 B2 | 3/2024 | Malkin et al. |
| 11,925,795 B2 | 3/2024 | Muller et al. |
| 11,925,796 B2 | 3/2024 | Tanner et al. |
| 11,925,797 B2 | 3/2024 | Tanner et al. |
| 11,930,996 B2 | 3/2024 | Dresher |

(56) References Cited

U.S. PATENT DOCUMENTS

| | | |
|---|---|---|
| 11,930,997 B2 | 3/2024 | Melito et al. |
| 11,931,003 B2 | 3/2024 | Congdon et al. |
| 11,931,058 B2 | 3/2024 | Spangler et al. |
| 11,931,068 B2 | 3/2024 | Fitterer et al. |
| 11,931,073 B2 | 3/2024 | Walsh et al. |
| 11,931,098 B2 | 3/2024 | Moriyama |
| 11,931,278 B2 | 3/2024 | Wood et al. |
| 11,931,528 B2 | 3/2024 | Rohl et al. |
| 11,931,530 B2 | 3/2024 | Campbell et al. |
| 11,937,774 B2 | 3/2024 | Wood et al. |
| 11,937,871 B2 | 3/2024 | Crawford et al. |
| 11,938,047 B2 | 3/2024 | Christakis et al. |
| 11,938,285 B2 | 3/2024 | Lau et al. |
| 11,938,311 B2 | 3/2024 | Corbett et al. |
| 11,944,805 B2 | 4/2024 | Stotz |
| D1,028,246 S | 5/2024 | Delorenzo |
| 11,980,385 B2 | 5/2024 | Haselman |
| 11,986,602 B2 | 5/2024 | Corbett |
| 11,986,604 B2 | 5/2024 | Siess |
| 12,005,248 B2 | 6/2024 | Vogt et al. |
| 12,011,583 B2 | 6/2024 | Wang |
| 12,017,058 B2 | 6/2024 | Kerkhoffs et al. |
| 12,017,076 B2 | 6/2024 | Tan et al. |
| 12,023,476 B2 | 7/2024 | Tuval et al. |
| 12,023,477 B2 | 7/2024 | Siess |
| 12,059,559 B2 | 8/2024 | Muller et al. |
| 12,064,120 B2 | 8/2024 | Hajjar et al. |
| 12,064,611 B2 | 8/2024 | D'Ambrosio et al. |
| 12,064,614 B2 | 8/2024 | Agah et al. |
| 12,064,615 B2 | 8/2024 | Stotz et al. |
| 12,064,616 B2 | 8/2024 | Spanier et al. |
| 12,076,497 B2 | 9/2024 | Fantuzzi et al. |
| 12,076,544 B2 | 9/2024 | Siess et al. |
| 12,076,549 B2 | 9/2024 | Stotz et al. |
| 12,090,314 B2 | 9/2024 | Tuval et al. |
| 12,092,114 B2 | 9/2024 | Siess |
| 12,097,016 B2 | 9/2024 | Goldvasser |
| 12,102,815 B2 | 10/2024 | Dhaliwal et al. |
| 12,104,600 B2 | 10/2024 | Mohl |
| 12,107,474 B2 | 10/2024 | Vollmer |
| 12,117,007 B1 | 10/2024 | Mohl |
| 12,121,681 B2 | 10/2024 | Korkuch |
| 12,121,713 B2 | 10/2024 | Calomeni et al. |
| 12,144,936 B2 | 11/2024 | Tao et al. |
| 12,144,976 B2 | 11/2024 | Baumbach et al. |
| 12,161,854 B2 | 12/2024 | Earles et al. |
| 12,161,855 B2 | 12/2024 | Hastie et al. |
| 12,161,857 B2 | 12/2024 | Saul et al. |
| 12,171,993 B2 | 12/2024 | Higgins et al. |
| 12,186,517 B2 | 1/2025 | Modlish et al. |
| 12,194,287 B2 | 1/2025 | Kassel et al. |
| 12,196,210 B2 | 1/2025 | Siess et al. |
| 12,201,823 B2 | 1/2025 | Baumbach et al. |
| 12,207,906 B2 | 1/2025 | Tuval et al. |
| 12,213,771 B2 | 2/2025 | Curran et al. |
| 12,233,224 B2 | 2/2025 | Korkuch et al. |
| 12,233,251 B2 | 2/2025 | Siess et al. |
| 12,239,799 B2 | 3/2025 | Corbett et al. |
| 12,241,480 B2 | 3/2025 | Corbett et al. |
| 12,263,330 B2 | 4/2025 | D'Ambrosio et al. |
| 12,263,333 B2 | 4/2025 | Stotz et al. |
| 12,263,334 B2 | 4/2025 | Corbett et al. |
| 12,268,860 B1 | 4/2025 | Fishman et al. |
| 12,268,861 B2 | 4/2025 | D'Ambrosio et al. |
| 12,290,673 B2 | 5/2025 | Jahangir |
| 12,290,676 B2 | 5/2025 | Farago et al. |
| 12,303,678 B2 | 5/2025 | Kerkhoffs et al. |
| 12,303,680 B2 | 5/2025 | Siess et al. |
| 12,318,551 B2 | 6/2025 | Jahangir |
| 12,318,560 B2 | 6/2025 | O'Carrol et al. |
| 2001/0009645 A1 | 7/2001 | Noda |
| 2001/0041934 A1 | 11/2001 | Yamazaki et al. |
| 2002/0052638 A1 | 5/2002 | Zadno-Azizi |
| 2002/0076322 A1 | 6/2002 | Maeda et al. |
| 2002/0077600 A1 | 6/2002 | Sirimanne |
| 2002/0082585 A1 | 6/2002 | Carroll et al. |
| 2002/0147495 A1 | 10/2002 | Petroff |
| 2002/0153664 A1 | 10/2002 | Schroeder |
| 2003/0032941 A1 | 2/2003 | Boyle et al. |
| 2003/0060685 A1 | 3/2003 | Houser |
| 2003/0091450 A1 | 5/2003 | Davis et al. |
| 2003/0100816 A1 | 5/2003 | Siess |
| 2003/0111800 A1 | 6/2003 | Kreutzer |
| 2003/0139643 A1 | 7/2003 | Smith et al. |
| 2003/0191357 A1 | 10/2003 | Frazier |
| 2003/0199727 A1 | 10/2003 | Burke |
| 2004/0034411 A1 | 2/2004 | Quijano |
| 2004/0044266 A1 | 3/2004 | Siess et al. |
| 2004/0066107 A1 | 4/2004 | Gery |
| 2004/0102674 A1 | 5/2004 | Zadini et al. |
| 2004/0115038 A1 | 6/2004 | Nuesser et al. |
| 2004/0167376 A1 | 8/2004 | Peters et al. |
| 2004/0234391 A1 | 11/2004 | Izraelev |
| 2004/0241019 A1 | 12/2004 | Goldowsky |
| 2004/0260346 A1 | 12/2004 | Overall et al. |
| 2005/0006083 A1 | 1/2005 | Chen et al. |
| 2005/0008509 A1 | 1/2005 | Chang |
| 2005/0019167 A1 | 1/2005 | Nusser et al. |
| 2005/0085683 A1 | 4/2005 | Bolling et al. |
| 2005/0182435 A1 | 8/2005 | Andrews et al. |
| 2005/0220636 A1 | 10/2005 | Henein et al. |
| 2005/0254976 A1 | 11/2005 | Carrier et al. |
| 2005/0272975 A1 | 12/2005 | McWeeney |
| 2006/0030809 A1 | 2/2006 | Barzilay et al. |
| 2006/0062672 A1 | 3/2006 | McBride et al. |
| 2006/0155158 A1 | 7/2006 | Aboul-Hosn |
| 2006/0224110 A1 | 10/2006 | Scott et al. |
| 2006/0276682 A1 | 12/2006 | Bolling et al. |
| 2007/0004959 A1 | 1/2007 | Carrier et al. |
| 2007/0142696 A1 | 6/2007 | Crosby et al. |
| 2007/0156006 A1 | 7/2007 | Smith et al. |
| 2008/0015517 A1 | 1/2008 | Geistert et al. |
| 2008/0058925 A1 | 3/2008 | Cohen |
| 2008/0086027 A1 | 4/2008 | Siess et al. |
| 2008/0097293 A1 | 4/2008 | Chin et al. |
| 2008/0097386 A1 | 4/2008 | Osypka |
| 2008/0114339 A1 | 5/2008 | McBride et al. |
| 2008/0183136 A1 | 7/2008 | Lenker et al. |
| 2008/0262289 A1 | 10/2008 | Goldowsky |
| 2008/0269822 A1 | 10/2008 | Ljungstrom et al. |
| 2008/0292478 A1 | 11/2008 | Baykut et al. |
| 2008/0306328 A1 | 12/2008 | Ercolani |
| 2009/0004037 A1 | 1/2009 | Ito |
| 2009/0054840 A1 | 2/2009 | Drake et al. |
| 2009/0069886 A1 | 3/2009 | Suri et al. |
| 2009/0112312 A1 | 4/2009 | Larose et al. |
| 2009/0138080 A1 | 5/2009 | Siess et al. |
| 2009/0182200 A1 | 7/2009 | Golden |
| 2009/0203957 A1 | 8/2009 | LaRose et al. |
| 2009/0204205 A1 | 8/2009 | Larose et al. |
| 2010/0041939 A1 | 2/2010 | Siess |
| 2010/0082099 A1 | 4/2010 | Vodermayer et al. |
| 2010/0191035 A1 | 7/2010 | Kang et al. |
| 2010/0268017 A1 | 10/2010 | Siess |
| 2010/0298625 A1 | 11/2010 | Reichenbach et al. |
| 2011/0034874 A1 | 2/2011 | Reitan |
| 2011/0124962 A1 | 5/2011 | Gordin |
| 2011/0172505 A1 | 7/2011 | Kim |
| 2011/0184224 A1 | 7/2011 | Garrigue |
| 2011/0230821 A1 | 9/2011 | Babic |
| 2011/0237863 A1 | 9/2011 | Ricci et al. |
| 2011/0238172 A1 | 9/2011 | Akdis |
| 2011/0282274 A1 | 11/2011 | Fulton, III |
| 2012/0029265 A1* | 2/2012 | LaRose ............ A61M 60/422 600/16 |
| 2012/0035645 A1* | 2/2012 | Gross ............... A61M 60/139 606/200 |
| 2012/0088954 A1 | 4/2012 | Foster |
| 2012/0093628 A1 | 4/2012 | Liebing |
| 2012/0134793 A1 | 5/2012 | Wu et al. |
| 2012/0172655 A1 | 7/2012 | Campbell et al. |
| 2012/0178986 A1 | 7/2012 | Campbell et al. |
| 2012/0245404 A1 | 9/2012 | Smith |
| 2012/0247200 A1 | 10/2012 | Ahonen et al. |

(56) References Cited

U.S. PATENT DOCUMENTS

| | | |
|---|---|---|
| 2012/0283506 A1 | 11/2012 | Meister et al. |
| 2012/0296313 A1 | 11/2012 | Andreacchi et al. |
| 2012/0310036 A1 | 12/2012 | Peters et al. |
| 2013/0053623 A1 | 2/2013 | Evans |
| 2013/0085318 A1 | 4/2013 | Toellner |
| 2013/0209292 A1 | 8/2013 | Baykut et al. |
| 2013/0211324 A1 | 8/2013 | Voss et al. |
| 2013/0281761 A1 | 10/2013 | Kapur |
| 2013/0289376 A1 | 10/2013 | Lang |
| 2013/0303830 A1 | 11/2013 | Zeng et al. |
| 2013/0303831 A1 | 11/2013 | Evans |
| 2013/0303832 A1 | 11/2013 | Wampler |
| 2013/0303970 A1 | 11/2013 | Keenan et al. |
| 2013/0330219 A1 | 12/2013 | LaRose et al. |
| 2014/0005467 A1 | 1/2014 | Farnan et al. |
| 2014/0030122 A1 | 1/2014 | Ozaki |
| 2014/0051908 A1 | 2/2014 | Khanal et al. |
| 2014/0079557 A1 | 3/2014 | LaRose et al. |
| 2014/0107399 A1 | 4/2014 | Spence |
| 2014/0167545 A1 | 6/2014 | Bremner et al. |
| 2014/0180250 A1 | 6/2014 | Belson |
| 2014/0194717 A1 | 7/2014 | Wildhirt et al. |
| 2014/0200389 A1 | 7/2014 | Yanai et al. |
| 2014/0207232 A1 | 7/2014 | Garrigue |
| 2014/0275721 A1 | 9/2014 | Yanai et al. |
| 2014/0330069 A1 | 11/2014 | Hastings et al. |
| 2014/0341726 A1 | 11/2014 | Wu et al. |
| 2015/0031936 A1 | 1/2015 | LaRose et al. |
| 2015/0045696 A1 | 2/2015 | Osypka |
| 2015/0051435 A1 | 2/2015 | Siess et al. |
| 2015/0051438 A1 | 2/2015 | Taskin |
| 2015/0066082 A1 | 3/2015 | Moshe |
| 2015/0080743 A1 | 3/2015 | Siess |
| 2015/0090372 A1 | 4/2015 | Branagan et al. |
| 2015/0099923 A1 | 4/2015 | Magovern et al. |
| 2015/0119633 A1 | 4/2015 | Haselby et al. |
| 2015/0141738 A1 | 5/2015 | Toellner et al. |
| 2015/0141842 A1 | 5/2015 | Spanier et al. |
| 2015/0151087 A1 | 6/2015 | Suzuki et al. |
| 2015/0171694 A1 | 6/2015 | Dallas |
| 2015/0190092 A1 | 7/2015 | Mori |
| 2015/0273184 A1 | 10/2015 | Scott et al. |
| 2015/0290372 A1 | 10/2015 | Muller et al. |
| 2015/0290373 A1 | 10/2015 | Rudser et al. |
| 2015/0290432 A1 | 10/2015 | Mathews et al. |
| 2015/0306291 A1 | 10/2015 | Bonde et al. |
| 2015/0343179 A1 | 12/2015 | Schumacher et al. |
| 2015/0359952 A1 | 12/2015 | Andrus et al. |
| 2015/0365738 A1 | 12/2015 | Purvis et al. |
| 2016/0008531 A1 | 1/2016 | Wang et al. |
| 2016/0030649 A1 | 2/2016 | Zeng |
| 2016/0038663 A1 | 2/2016 | Taskin et al. |
| 2016/0045654 A1 | 2/2016 | Connor |
| 2016/0067395 A1 | 3/2016 | Jimenez et al. |
| 2016/0095744 A1 | 4/2016 | Wolfertz et al. |
| 2016/0144089 A1 | 5/2016 | Woo et al. |
| 2016/0144166 A1 | 5/2016 | Decré et al. |
| 2016/0166747 A1 | 6/2016 | Frazier et al. |
| 2016/0213828 A1 | 7/2016 | Sievers |
| 2016/0223086 A1 | 8/2016 | Balsells et al. |
| 2016/0256620 A1 | 9/2016 | Scheckel et al. |
| 2016/0271309 A1 | 9/2016 | Throckmorton et al. |
| 2016/0279311 A1 | 9/2016 | Cecere et al. |
| 2016/0367739 A1 | 12/2016 | Wiesener et al. |
| 2016/0375187 A1 | 12/2016 | Lee et al. |
| 2017/0021069 A1 | 1/2017 | Hodges |
| 2017/0021074 A1 | 1/2017 | Opfermann et al. |
| 2017/0035952 A1 | 2/2017 | Muller |
| 2017/0043074 A1 | 2/2017 | Siess |
| 2017/0049947 A1 | 2/2017 | Corbett et al. |
| 2017/0065267 A1 | 3/2017 | Fantuzzi et al. |
| 2017/0080136 A1 | 3/2017 | Janeczek et al. |
| 2017/0080199 A1 | 3/2017 | Murphy |
| 2017/0087286 A1 | 3/2017 | Spanier et al. |
| 2017/0087288 A1 | 3/2017 | Groß-Hardt et al. |
| 2017/0128644 A1 | 5/2017 | Foster |
| 2017/0136225 A1 | 5/2017 | Siess et al. |
| 2017/0143938 A1 | 5/2017 | Ogle et al. |
| 2017/0143952 A1 | 5/2017 | Siess et al. |
| 2017/0157309 A1 | 6/2017 | Begg et al. |
| 2017/0209099 A1 | 7/2017 | Caron et al. |
| 2017/0209633 A1 | 7/2017 | Cohen |
| 2017/0215918 A1 | 8/2017 | Tao et al. |
| 2017/0232169 A1 | 8/2017 | Muller |
| 2017/0232170 A1 | 8/2017 | Jarvik |
| 2017/0232171 A1 | 8/2017 | Roehn et al. |
| 2017/0274128 A1 | 9/2017 | Tamburino et al. |
| 2017/0312492 A1 | 11/2017 | Fantuzzi et al. |
| 2017/0333607 A1 | 11/2017 | Zarins |
| 2017/0333608 A1 | 11/2017 | Zeng |
| 2017/0340787 A1 | 11/2017 | Corbett et al. |
| 2017/0340788 A1 | 11/2017 | Korakianitis et al. |
| 2017/0340789 A1 | 11/2017 | Bonde et al. |
| 2017/0343043 A1 | 11/2017 | Walsh et al. |
| 2017/0368245 A1 | 12/2017 | Kantrowitz et al. |
| 2018/0001003 A1 | 1/2018 | Moran et al. |
| 2018/0015214 A1 | 1/2018 | Lynch |
| 2018/0021494 A1 | 1/2018 | Muller et al. |
| 2018/0021495 A1 | 1/2018 | Muller et al. |
| 2018/0050141 A1 | 2/2018 | Corbett et al. |
| 2018/0055979 A1 | 3/2018 | Corbett et al. |
| 2018/0064860 A1 | 3/2018 | Nunez et al. |
| 2018/0093070 A1 | 4/2018 | Cottone |
| 2018/0099076 A1 | 4/2018 | LaRose |
| 2018/0099078 A1 | 4/2018 | Tuseth et al. |
| 2018/0104397 A1 | 4/2018 | Schumacher |
| 2018/0110907 A1 | 4/2018 | Keenan et al. |
| 2018/0133379 A1 | 5/2018 | Farnan et al. |
| 2018/0154058 A1 | 6/2018 | Menon et al. |
| 2018/0169312 A1 | 6/2018 | Barry |
| 2018/0169313 A1 | 6/2018 | Schwammenthal et al. |
| 2018/0200422 A1 | 7/2018 | Nguyen et al. |
| 2018/0207334 A1 | 7/2018 | Siess |
| 2018/0207336 A1 | 7/2018 | Solem |
| 2018/0219452 A1 | 8/2018 | Boisclair |
| 2018/0221551 A1 | 8/2018 | Tanner et al. |
| 2018/0221553 A1 | 8/2018 | Taskin |
| 2018/0228950 A1 | 8/2018 | Janeczek et al. |
| 2018/0228953 A1 | 8/2018 | Siess et al. |
| 2018/0243004 A1 | 8/2018 | Von Segesser et al. |
| 2018/0243489 A1 | 8/2018 | Haddadi |
| 2018/0250456 A1 | 9/2018 | Nitzan et al. |
| 2018/0256797 A1 | 9/2018 | Schenck et al. |
| 2018/0280598 A1 | 10/2018 | Curran et al. |
| 2018/0289877 A1 | 10/2018 | Schumacher et al. |
| 2018/0296742 A1 | 10/2018 | Toellner |
| 2018/0303990 A1 | 10/2018 | Siess et al. |
| 2018/0303991 A1 | 10/2018 | Nüsser et al. |
| 2018/0311421 A1 | 11/2018 | Tuseth |
| 2018/0311423 A1 | 11/2018 | Zeng et al. |
| 2018/0318483 A1 | 11/2018 | Dague et al. |
| 2018/0318547 A1 | 11/2018 | Yokoyama |
| 2018/0326131 A1 | 11/2018 | Muller et al. |
| 2018/0326132 A1 | 11/2018 | Maimon et al. |
| 2018/0333059 A1 | 11/2018 | Casas |
| 2018/0335037 A1 | 11/2018 | Shambaugh et al. |
| 2018/0345028 A1 | 12/2018 | Aboud et al. |
| 2018/0361042 A1 | 12/2018 | Fitzgerald et al. |
| 2018/0369469 A1 | 12/2018 | Le Duc De Lillers et al. |
| 2019/0001034 A1 | 1/2019 | Taskin et al. |
| 2019/0001103 A1 | 1/2019 | Korkuch |
| 2019/0004037 A1 | 1/2019 | Zhang et al. |
| 2019/0015232 A1 | 1/2019 | Tuseth et al. |
| 2019/0015568 A1 | 1/2019 | Tuseth |
| 2019/0015570 A1 | 1/2019 | Muller |
| 2019/0030228 A1 | 1/2019 | Keenan et al. |
| 2019/0046702 A1 | 2/2019 | Siess et al. |
| 2019/0046703 A1 | 2/2019 | Shambaugh et al. |
| 2019/0054223 A1 | 2/2019 | Frazier et al. |
| 2019/0060539 A1 | 2/2019 | Siess et al. |
| 2019/0060543 A1* | 2/2019 | Khanal ............... A61B 1/00148 |
| 2019/0069898 A1 | 3/2019 | Farnan |
| 2019/0076167 A1 | 3/2019 | Fantuzzi et al. |
| 2019/0083082 A1 | 3/2019 | Tassoni, Jr. et al. |

(56) References Cited

U.S. PATENT DOCUMENTS

| | | |
|---|---|---|
| 2019/0083690 A1 | 3/2019 | Siess et al. |
| 2019/0099532 A1 | 4/2019 | Er |
| 2019/0101130 A1 | 4/2019 | Bredenbreuker et al. |
| 2019/0105437 A1 | 4/2019 | Siess et al. |
| 2019/0117865 A1 | 4/2019 | Walters et al. |
| 2019/0125948 A1 | 5/2019 | Stanfield et al. |
| 2019/0143016 A1 | 5/2019 | Corbett et al. |
| 2019/0143018 A1 | 5/2019 | Salahieh et al. |
| 2019/0154053 A1 | 5/2019 | McBride et al. |
| 2019/0167122 A1* | 6/2019 | Obermiller ......... A61M 60/497 |
| 2019/0167305 A1 | 6/2019 | Pedersen et al. |
| 2019/0167875 A1 | 6/2019 | Simon et al. |
| 2019/0167878 A1 | 6/2019 | Rowe |
| 2019/0170153 A1 | 6/2019 | Scheckel |
| 2019/0175806 A1 | 6/2019 | Tuval et al. |
| 2019/0184078 A1 | 6/2019 | Zilbershlag et al. |
| 2019/0184080 A1 | 6/2019 | Mohl |
| 2019/0192752 A1 | 6/2019 | Tiller et al. |
| 2019/0199165 A1 | 6/2019 | Carson |
| 2019/0201603 A1 | 7/2019 | Siess et al. |
| 2019/0209755 A1 | 7/2019 | Nix et al. |
| 2019/0209758 A1 | 7/2019 | Tuval et al. |
| 2019/0211836 A1 | 7/2019 | Schumacher et al. |
| 2019/0211846 A1 | 7/2019 | Liebing |
| 2019/0211847 A1 | 7/2019 | Walsh et al. |
| 2019/0223877 A1 | 7/2019 | Nitzen et al. |
| 2019/0224390 A1 | 7/2019 | Barry |
| 2019/0231523 A1 | 8/2019 | Lombardi |
| 2019/0232025 A1 | 8/2019 | Tao et al. |
| 2019/0247627 A1 | 8/2019 | Korkuch et al. |
| 2019/0269840 A1 | 9/2019 | Tuval et al. |
| 2019/0275224 A1 | 9/2019 | Hanson et al. |
| 2019/0282741 A1 | 9/2019 | Franano et al. |
| 2019/0282744 A1 | 9/2019 | D'Ambrosio et al. |
| 2019/0282746 A1 | 9/2019 | Judisch |
| 2019/0290817 A1 | 9/2019 | Guo et al. |
| 2019/0298902 A1 | 10/2019 | Siess et al. |
| 2019/0298974 A1 | 10/2019 | Siess et al. |
| 2019/0316591 A1 | 10/2019 | Toellner |
| 2019/0321527 A1 | 10/2019 | King et al. |
| 2019/0321529 A1 | 10/2019 | Korakianitis et al. |
| 2019/0321531 A1 | 10/2019 | Cambronne et al. |
| 2019/0336664 A1 | 11/2019 | Liebing |
| 2019/0344000 A1 | 11/2019 | Kushwaha et al. |
| 2019/0344001 A1 | 11/2019 | Salahieh et al. |
| 2019/0344052 A1 | 11/2019 | Klepetko |
| 2019/0351117 A1 | 11/2019 | Cambronne et al. |
| 2019/0351119 A1 | 11/2019 | Cambronne et al. |
| 2019/0351120 A1 | 11/2019 | Kushwaha et al. |
| 2019/0358378 A1 | 11/2019 | Schumacher |
| 2019/0358379 A1 | 11/2019 | Wiessler et al. |
| 2019/0358384 A1 | 11/2019 | Epple |
| 2019/0365975 A1 | 12/2019 | Muller et al. |
| 2019/0381226 A1 | 12/2019 | Morozov et al. |
| 2019/0383298 A1 | 12/2019 | Toellner |
| 2020/0000988 A1 | 1/2020 | Epple |
| 2020/0000989 A1 | 1/2020 | Matheis et al. |
| 2020/0016309 A1 | 1/2020 | Kallenbach et al. |
| 2020/0022811 A1 | 1/2020 | Griswold |
| 2020/0023109 A1 | 1/2020 | Epple |
| 2020/0023110 A1 | 1/2020 | Jahangir |
| 2020/0023113 A1 | 1/2020 | Epple et al. |
| 2020/0030507 A1 | 1/2020 | Higgins et al. |
| 2020/0030509 A1 | 1/2020 | Siess et al. |
| 2020/0030510 A1 | 1/2020 | Higgins |
| 2020/0030511 A1 | 1/2020 | Higgins |
| 2020/0030512 A1 | 1/2020 | Higgins et al. |
| 2020/0038567 A1 | 2/2020 | Siess et al. |
| 2020/0038568 A1 | 2/2020 | Higgins et al. |
| 2020/0038571 A1 | 2/2020 | Jahangir |
| 2020/0054857 A1 | 2/2020 | Scheckel |
| 2020/0054861 A1 | 2/2020 | Korkuch et al. |
| 2020/0069857 A1 | 3/2020 | Schwammenthal et al. |
| 2020/0086021 A1 | 3/2020 | Jeevanandam et al. |
| 2020/0088207 A1 | 3/2020 | Schumacher et al. |
| 2020/0094019 A1 | 3/2020 | Siess et al. |
| 2020/0114053 A1 | 4/2020 | Salahieh et al. |
| 2020/0121905 A1 | 4/2020 | Zoll |
| 2020/0129684 A1 | 4/2020 | Pfeffer et al. |
| 2020/0139028 A1 | 5/2020 | Scheckel et al. |
| 2020/0139029 A1 | 5/2020 | Scheckel et al. |
| 2020/0147283 A1 | 5/2020 | Tanner et al. |
| 2020/0155739 A1 | 5/2020 | Siess et al. |
| 2020/0164125 A1 | 5/2020 | Muller et al. |
| 2020/0164126 A1 | 5/2020 | Muller |
| 2020/0179657 A1 | 6/2020 | Liu |
| 2020/0261633 A1 | 8/2020 | Spanier |
| 2020/0345337 A1 | 11/2020 | Muller et al. |
| 2020/0350812 A1 | 11/2020 | Vogt et al. |
| 2021/0052793 A1 | 2/2021 | Struthers et al. |
| 2021/0093836 A1 | 4/2021 | Fantuzzi |
| 2021/0146116 A1 | 5/2021 | Siess |
| 2021/0205585 A1 | 7/2021 | Ullmann |
| 2021/0236803 A1 | 8/2021 | Stotz |
| 2021/0268264 A1 | 9/2021 | Stotz |
| 2021/0275791 A1 | 9/2021 | Korkuch et al. |
| 2021/0290929 A1 | 9/2021 | Stotz |
| 2021/0290930 A1 | 9/2021 | Kasel |
| 2021/0290931 A1 | 9/2021 | Baumbach |
| 2021/0290932 A1 | 9/2021 | Stotz |
| 2021/0290937 A1 | 9/2021 | Baumbach |
| 2021/0290939 A1 | 9/2021 | Baumbach |
| 2021/0313869 A1 | 10/2021 | Strasswiemer et al. |
| 2021/0316133 A1 | 10/2021 | Kassel et al. |
| 2021/0322756 A1 | 10/2021 | Vollmer et al. |
| 2021/0330958 A1 | 10/2021 | Stotz et al. |
| 2021/0338999 A1 | 11/2021 | Stotz et al. |
| 2021/0339004 A1 | 11/2021 | Schlebusch et al. |
| 2021/0339005 A1 | 11/2021 | Stotz et al. |
| 2021/0346678 A1 | 11/2021 | Baumbach et al. |
| 2021/0346680 A1 | 11/2021 | Vogt et al. |
| 2021/0379355 A1 | 12/2021 | Schuelke et al. |
| 2021/0379358 A1 | 12/2021 | Schuelke et al. |
| 2021/0384812 A1 | 12/2021 | Vollmer et al. |
| 2022/0008053 A1 | 1/2022 | Fitzgerald et al. |
| 2022/0008714 A1 | 1/2022 | Stotz |
| 2022/0016411 A1 | 1/2022 | Winterwerber |
| 2022/0072296 A1 | 3/2022 | Mori |
| 2022/0072297 A1 | 3/2022 | Tuval et al. |
| 2022/0080178 A1 | 3/2022 | Salahieh et al. |
| 2022/0080180 A1 | 3/2022 | Siess et al. |
| 2022/0080182 A1 | 3/2022 | Earles et al. |
| 2022/0080183 A1 | 3/2022 | Earles et al. |
| 2022/0080184 A1 | 3/2022 | Clifton et al. |
| 2022/0080185 A1 | 3/2022 | Clifton et al. |
| 2022/0096125 A1 | 3/2022 | Fantuzzi et al. |
| 2022/0105337 A1 | 4/2022 | Salahieh et al. |
| 2022/0105339 A1 | 4/2022 | Nix et al. |
| 2022/0126083 A1 | 4/2022 | Grauwinkel et al. |
| 2022/0161018 A1 | 5/2022 | Mitze et al. |
| 2022/0161019 A1 | 5/2022 | Mitze et al. |
| 2022/0161021 A1 | 5/2022 | Mitze et al. |
| 2022/0241580 A1 | 8/2022 | Stotz et al. |
| 2022/0323742 A1 | 10/2022 | Grauwinkel et al. |
| 2022/0339400 A1 | 10/2022 | Fantuzzi et al. |
| 2022/0407403 A1 | 12/2022 | Vogt et al. |
| 2023/0001178 A1 | 1/2023 | Corbett et al. |
| 2023/0091199 A1 | 3/2023 | Siess et al. |
| 2023/0145482 A1 | 5/2023 | Garrigue |
| 2023/0277833 A1 | 9/2023 | Sharma et al. |
| 2023/0277836 A1 | 9/2023 | Schellenberg et al. |
| 2023/0293878 A1 | 9/2023 | Christof et al. |
| 2023/0364411 A1 | 11/2023 | Bette |
| 2023/0398330 A1 | 12/2023 | Mitze et al. |
| 2023/0405286 A1 | 12/2023 | Schumacher et al. |
| 2024/0074828 A1 | 3/2024 | Wenning |
| 2024/0075277 A1 | 3/2024 | Schellenberg |
| 2024/0102475 A1 | 3/2024 | Schuelke et al. |
| 2024/0165392 A1 | 5/2024 | Liu et al. |
| 2024/0198084 A1 | 6/2024 | Stotz |
| 2024/0245902 A1 | 7/2024 | Schlebusch et al. |
| 2024/0269451 A1 | 8/2024 | Siess et al. |
| 2024/0269459 A1 | 8/2024 | Schellenberg et al. |
| 2024/0277998 A1 | 8/2024 | Vogt et al. |

(56) References Cited

U.S. PATENT DOCUMENTS

| | | |
|---|---|---|
| 2024/0285935 A1 | 8/2024 | Popov et al. |
| 2024/0335651 A1 | 10/2024 | Mitze et al. |
| 2024/0399135 A1 | 12/2024 | Stotz et al. |
| 2025/0032773 A1 | 1/2025 | Baumbach et al. |
| 2025/0082922 A1 | 3/2025 | Fabiunke et al. |
| 2025/0121177 A1 | 4/2025 | West |
| 2025/0144397 A1 | 5/2025 | Kassel et al. |
| 2025/0161660 A1 | 5/2025 | Baumbach et al. |
| 2025/0170388 A1 | 5/2025 | Kerkhoffs et al. |

FOREIGN PATENT DOCUMENTS

| | | |
|---|---|---|
| AU | 2012261669 | 1/2013 |
| AU | 2013203301 | 5/2013 |
| AU | 2013273663 | 1/2014 |
| BR | PI0904483-3 | 7/2011 |
| CA | 2 026 692 | 4/1992 |
| CA | 2 026 693 | 4/1992 |
| CA | 2 292 432 | 5/1998 |
| CA | 2 664 835 | 2/2008 |
| CA | 2 796 357 | 10/2011 |
| CA | 3 000 581 | 4/2017 |
| CA | 2 947 984 | 11/2022 |
| CN | 1222862 A | 7/1999 |
| CN | 1254598 A | 5/2000 |
| CN | 1376523 A | 10/2002 |
| CN | 2535055 | 2/2003 |
| CN | 1118304 C | 8/2003 |
| CN | 2616217 | 5/2004 |
| CN | 1524000 | 8/2004 |
| CN | 1202871 C | 5/2005 |
| CN | 1833736 A | 9/2006 |
| CN | 200977306 | 11/2007 |
| CN | 101112628 | 1/2008 |
| CN | 101128168 | 2/2008 |
| CN | 201150675 | 11/2008 |
| CN | 101677812 | 3/2010 |
| CN | 201437016 | 4/2010 |
| CN | 201618200 | 11/2010 |
| CN | 201658687 | 12/2010 |
| CN | 201710717 | 1/2011 |
| CN | 201894758 | 7/2011 |
| CN | 102438552 | 5/2012 |
| CN | 102475923 | 5/2012 |
| CN | 102545538 | 7/2012 |
| CN | 202314596 | 7/2012 |
| CN | 102743801 | 10/2012 |
| CN | 103143072 | 6/2013 |
| CN | 103845766 | 6/2014 |
| CN | 103861162 | 6/2014 |
| CN | 103915980 | 7/2014 |
| CN | 203809157 | 9/2014 |
| CN | 203842087 | 9/2014 |
| CN | 104208763 | 12/2014 |
| CN | 104208764 | 12/2014 |
| CN | 203971004 | 12/2014 |
| CN | 104274873 | 1/2015 |
| CN | 204106671 | 1/2015 |
| CN | 204219479 | 3/2015 |
| CN | 103877630 | 2/2016 |
| CN | 205215814 | 5/2016 |
| CN | 103977464 | 8/2016 |
| CN | 104162192 | 9/2016 |
| CN | 104888293 | 3/2017 |
| CN | 106512117 | 3/2017 |
| CN | 104225696 | 6/2017 |
| CN | 107019824 | 8/2017 |
| CN | 107080871 | 8/2017 |
| CN | 206443963 | 8/2017 |
| CN | 107206139 | 9/2017 |
| CN | 107281567 | 10/2017 |
| CN | 104707194 | 11/2017 |
| CN | 107412892 | 12/2017 |
| CN | 107921187 | 4/2018 |
| CN | 105498002 | 6/2018 |
| CN | 106310410 | 7/2018 |
| CN | 207708250 | 8/2018 |
| CN | 106902404 | 8/2019 |
| CN | 110237327 | 9/2019 |
| CN | 209790495 | 12/2019 |
| CN | 110665079 | 1/2020 |
| CN | 210020563 | 2/2020 |
| CN | 111166948 | 5/2020 |
| CN | 111166949 | 5/2020 |
| CN | 113413544 | 9/2021 |
| CN | 215691046 | 2/2022 |
| CN | 215841206 | 2/2022 |
| CN | 217828630 | 11/2022 |
| CN | 218922664 | 4/2023 |
| CN | 116077106 | 5/2023 |
| CN | 116271502 | 6/2023 |
| CN | 116365757 | 6/2023 |
| CN | 219250364 | 6/2023 |
| CN | 116785582 | 9/2023 |
| CN | 116688321 | 10/2023 |
| CN | 116531654 | 11/2023 |
| CN | 116440404 | 3/2024 |
| CN | 117018427 | 3/2024 |
| CN | 117482377 | 4/2024 |
| CN | 117959584 | 5/2024 |
| CN | 118320293 | 7/2024 |
| CN | 118320294 | 7/2024 |
| CN | 113769260 | 9/2024 |
| CN | 118142074 | 9/2024 |
| CN | 118681125 | 9/2024 |
| CN | 118899971 | 11/2024 |
| DE | 1 001 642 | 1/1957 |
| DE | 1 165 144 | 3/1964 |
| DE | 27 07 951 | 9/1977 |
| DE | 26 24 058 | 12/1977 |
| DE | 3 545 214 | 7/1986 |
| DE | 41 05 278 | 8/1992 |
| DE | 195 46 336 | 5/1997 |
| DE | 695 01 834 | 10/1998 |
| DE | 198 54 724 | 5/1999 |
| DE | 198 21 307 | 10/1999 |
| DE | 199 10 872 | 10/1999 |
| DE | 199 56 380 | 11/1999 |
| DE | 100 59 714 | 5/2002 |
| DE | 103 45 694 | 4/2005 |
| DE | 697 31 709 | 4/2005 |
| DE | 101 55 011 | 11/2005 |
| DE | 601 19 592 | 9/2006 |
| DE | 11 2004 001 809 | 11/2006 |
| DE | 20 2005 020 288 | 6/2007 |
| DE | 10 2006 019 206 | 10/2007 |
| DE | 10 2006 036 948 | 2/2008 |
| DE | 10 2008 060 357 | 6/2010 |
| DE | 10 2009 011 726 | 9/2010 |
| DE | 10 2009 039 658 | 3/2011 |
| DE | 10 2009 047 845 | 3/2011 |
| DE | 20 2009 018 416 | 8/2011 |
| DE | 10 2010 041 995 | 4/2012 |
| DE | 11 2009 000 185 | 3/2013 |
| DE | 10 2012 022 456 | 5/2014 |
| DE | 10 2013 007 562 | 11/2014 |
| DE | 20 2013 007 408 | 12/2014 |
| DE | 10 2014 210 299 | 12/2015 |
| DE | 10 2014 212 323 | 12/2015 |
| DE | 11 2014 001 418 | 12/2015 |
| DE | 10 2014 224 151 | 6/2016 |
| DE | 10 2015 216 050 | 2/2017 |
| DE | 10 2015 219 263 | 4/2017 |
| DE | 10 2015 222 199 | 5/2017 |
| DE | 20 2015 009 422 | 7/2017 |
| DE | 10 2012 207 042 | 9/2017 |
| DE | 10 2016 013 334 | 4/2018 |
| DE | 10 2016 122 268 | 5/2018 |
| DE | 10 2017 209 917 | 12/2018 |
| DE | 10 2017 212 193 | 1/2019 |
| DE | 10 2018 207 564 | 11/2019 |
| DE | 10 2018 207 578 | 11/2019 |
| DE | 10 2018 207 585 | 11/2019 |
| DE | 10 2018 207 591 | 11/2019 |

(56) References Cited

FOREIGN PATENT DOCUMENTS

| | | |
|---|---|---|
| DE | 10 2018 207 594 | 11/2019 |
| DE | 10 2018 207 611 | 11/2019 |
| DE | 10 2018 207 622 | 11/2019 |
| DE | 10 2018 208 536 | 12/2019 |
| DE | 10 2018 208 537 | 12/2019 |
| DE | 10 2018 208 540 | 12/2019 |
| DE | 10 2018 208 541 | 12/2019 |
| DE | 10 2018 208 550 | 12/2019 |
| DE | 10 2018 208 564 | 12/2019 |
| DE | 10 2018 208 945 | 12/2019 |
| DE | 10 2018 210 076 | 12/2019 |
| DE | 10 2018 207 624 | 1/2020 |
| DE | 10 2018 211 297 | 1/2020 |
| DE | 10 2018 211 327 | 1/2020 |
| DE | 10 2018 211 328 | 1/2020 |
| DE | 10 2018 212 153 | 1/2020 |
| DE | 10 2018 213 350 | 2/2020 |
| DE | 10 2018 220 658 | 6/2020 |
| DE | 10 2020 102 473 | 8/2021 |
| DE | 11 2020 003 063 | 3/2022 |
| DE | 11 2020 004 148 | 6/2022 |
| EP | 0 050 814 | 5/1982 |
| EP | 0 064 212 | 11/1982 |
| EP | 0 411 605 | 2/1991 |
| EP | 0 629 412 | 12/1994 |
| EP | 0 764 448 | 3/1997 |
| EP | 0 855 515 | 7/1998 |
| EP | 0 890 179 | 1/1999 |
| EP | 0 916 359 | 5/1999 |
| EP | 1 013 294 | 6/2000 |
| EP | 0 898 481 | 1/2002 |
| EP | 1 186 873 | 3/2002 |
| EP | 1 105 181 | 2/2004 |
| EP | 1 475 880 | 11/2004 |
| EP | 1 169 072 | 5/2005 |
| EP | 1 176 999 | 7/2005 |
| EP | 1 801 420 | 6/2007 |
| EP | 2 009 233 | 12/2008 |
| EP | 1 660 164 | 4/2009 |
| EP | 2 098 746 | 9/2009 |
| EP | 2 047 872 | 9/2010 |
| EP | 2 039 390 | 11/2010 |
| EP | 2 403 109 | 1/2012 |
| EP | 2 436 417 | 4/2012 |
| EP | 2 187 807 | 6/2012 |
| EP | 2 330 724 | 8/2012 |
| EP | 2 716 242 | 4/2014 |
| EP | 3 326 567 | 10/2014 |
| EP | 1 898 971 | 3/2015 |
| EP | 2 015 821 | 5/2015 |
| EP | 2 519 273 | 8/2015 |
| EP | 2 217 302 | 9/2015 |
| EP | 2 438 936 | 10/2015 |
| EP | 2 438 937 | 10/2015 |
| EP | 2 960 515 | 12/2015 |
| EP | 2 680 896 | 1/2016 |
| EP | 2 968 718 | 1/2016 |
| EP | 1 996 252 | 5/2016 |
| EP | 2 475 415 | 6/2016 |
| EP | 2 906 265 | 7/2016 |
| EP | 3 069 739 | 9/2016 |
| EP | 2 934 649 | 11/2016 |
| EP | 1 931 403 | 1/2017 |
| EP | 3 127 562 | 2/2017 |
| EP | 2 585 129 | 3/2017 |
| EP | 2 646 068 | 3/2017 |
| EP | 3 187 210 | 7/2017 |
| EP | 3 222 301 | 9/2017 |
| EP | 3 222 302 | 9/2017 |
| EP | 3 020 426 | 12/2017 |
| EP | 3 038 669 | 1/2018 |
| EP | 3 062 730 | 1/2018 |
| EP | 3 180 050 | 2/2018 |
| EP | 3 287 154 | 2/2018 |
| EP | 1 789 129 | 6/2018 |
| EP | 2 366 412 | 8/2018 |
| EP | 3 205 359 | 8/2018 |
| EP | 3 205 360 | 8/2018 |
| EP | 3 398 625 | 11/2018 |
| EP | 3 131 599 | 2/2019 |
| EP | 3 456 367 | 3/2019 |
| EP | 3 119 451 | 6/2019 |
| EP | 3 508 245 | 7/2019 |
| EP | 3 187 222 | 9/2019 |
| EP | 3 536 360 | 9/2019 |
| EP | 3 542 835 | 9/2019 |
| EP | 3 542 836 | 9/2019 |
| EP | 3 077 038 | 10/2019 |
| EP | 3 062 877 | 12/2019 |
| EP | 2 962 720 | 1/2020 |
| EP | 1 819 391 | 2/2020 |
| EP | 3 189 862 | 2/2020 |
| EP | 3 618 886 | 3/2020 |
| EP | 2 922 593 | 4/2020 |
| EP | 3 180 064 | 4/2020 |
| EP | 3 668 560 | 6/2020 |
| EP | 3 711 785 | 9/2020 |
| EP | 3 711 786 | 9/2020 |
| EP | 3 711 787 | 9/2020 |
| EP | 3 720 520 | 10/2020 |
| EP | 3 069 738 | 12/2020 |
| EP | 3 069 740 | 12/2020 |
| EP | 3 131 597 | 12/2020 |
| EP | 3 142 722 | 12/2020 |
| EP | 3 579 894 | 12/2020 |
| EP | 3 188 769 | 1/2021 |
| EP | 3 490 122 | 1/2021 |
| EP | 2 869 866 | 2/2021 |
| EP | 3 398 626 | 2/2021 |
| EP | 3 487 549 | 2/2021 |
| EP | 3 113 806 | 3/2021 |
| EP | 3 419 711 | 3/2021 |
| EP | 3 615 103 | 3/2021 |
| EP | 3 794 720 | 3/2021 |
| EP | 4 271 461 | 3/2021 |
| EP | 2 344 218 | 4/2021 |
| EP | 3 436 104 | 4/2021 |
| EP | 3 749 383 | 4/2021 |
| EP | 3 808 404 | 4/2021 |
| EP | 3 821 938 | 5/2021 |
| EP | 3 131 615 | 6/2021 |
| EP | 3 338 825 | 6/2021 |
| EP | 3 432 944 | 6/2021 |
| EP | 3 323 465 | 7/2021 |
| EP | 3 570 926 | 7/2021 |
| EP | 3 684 439 | 7/2021 |
| EP | 3 851 151 | 7/2021 |
| EP | 2 582 414 | 8/2021 |
| EP | 3 247 440 | 8/2021 |
| EP | 3 407 930 | 8/2021 |
| EP | 3 656 293 | 8/2021 |
| EP | 3 782 665 | 8/2021 |
| EP | 3 782 666 | 8/2021 |
| EP | 3 782 668 | 8/2021 |
| EP | 3 858 397 | 8/2021 |
| EP | 3 006 072 | 9/2021 |
| EP | 3 216 467 | 9/2021 |
| EP | 3 463 505 | 9/2021 |
| EP | 3 884 968 | 9/2021 |
| EP | 3 884 969 | 9/2021 |
| EP | 3 027 241 | 10/2021 |
| EP | 3 351 209 | 10/2021 |
| EP | 3 579 904 | 11/2021 |
| EP | 3 592 411 | 11/2021 |
| EP | 3 618 884 | 11/2021 |
| EP | 2 628 493 | 12/2021 |
| EP | 3 914 330 | 12/2021 |
| EP | 3 928 825 | 12/2021 |
| EP | 3 556 409 | 1/2022 |
| EP | 3 624 868 | 1/2022 |
| EP | 3 955 985 | 2/2022 |
| EP | 3 337 530 | 3/2022 |
| EP | 3 624 867 | 3/2022 |
| EP | 3 689 389 | 3/2022 |

(56) References Cited

FOREIGN PATENT DOCUMENTS

| | | |
|---|---|---|
| EP | 3 697 464 | 3/2022 |
| EP | 3 737 436 | 3/2022 |
| EP | 3 972 661 | 3/2022 |
| EP | 2 967 630 | 4/2022 |
| EP | 3 142 721 | 4/2022 |
| EP | 3 520 834 | 4/2022 |
| EP | 3 586 887 | 4/2022 |
| EP | 3 638 336 | 4/2022 |
| EP | 3 689 388 | 4/2022 |
| EP | 3 755 237 | 4/2022 |
| EP | 3 765 110 | 4/2022 |
| EP | 3 782 667 | 4/2022 |
| EP | 3 829 673 | 4/2022 |
| EP | 3 976 129 | 4/2022 |
| EP | 3 978 060 | 4/2022 |
| EP | 3 984 589 | 4/2022 |
| EP | 3 986 528 | 4/2022 |
| EP | 3 153 205 | 5/2022 |
| EP | 3 407 811 | 5/2022 |
| EP | 3 649 926 | 5/2022 |
| EP | 3 653 113 | 5/2022 |
| EP | 3 654 006 | 5/2022 |
| EP | 3 735 280 | 5/2022 |
| EP | 3 897 814 | 5/2022 |
| EP | 3 124 071 | 6/2022 |
| EP | 3 219 339 | 6/2022 |
| EP | 3 636 312 | 6/2022 |
| EP | 3 661 436 | 6/2022 |
| EP | 3 737 310 | 7/2022 |
| EP | 3 231 395 | 8/2022 |
| EP | 3 899 994 | 8/2022 |
| EP | 4 039 320 | 8/2022 |
| EP | 3 487 550 | 9/2022 |
| EP | 3 606 575 | 9/2022 |
| EP | 3 756 721 | 9/2022 |
| EP | 3 834 876 | 9/2022 |
| EP | 3 000 492 | 10/2022 |
| EP | 3 600 477 | 10/2022 |
| EP | 3 849 646 | 10/2022 |
| EP | 3 897 768 | 10/2022 |
| EP | 3 914 310 | 10/2022 |
| EP | 3 914 311 | 10/2022 |
| EP | 3 000 493 | 11/2022 |
| EP | 3 028 736 | 11/2022 |
| EP | 3 077 035 | 11/2022 |
| EP | 3 305 357 | 11/2022 |
| EP | 3 389 530 | 11/2022 |
| EP | 3 570 762 | 11/2022 |
| EP | 3 579 905 | 11/2022 |
| EP | 3 858 422 | 11/2022 |
| EP | 3 866 876 | 11/2022 |
| EP | 3 941 546 | 11/2022 |
| EP | 3 199 198 | 12/2022 |
| EP | 3 270 999 | 12/2022 |
| EP | 3 398 562 | 12/2022 |
| EP | 3 402 562 | 12/2022 |
| EP | 2 892 583 | 1/2023 |
| EP | 3 393 542 | 1/2023 |
| EP | 3 597 231 | 1/2023 |
| EP | 3 656 292 | 1/2023 |
| EP | 3 768 345 | 1/2023 |
| EP | 2 868 332 | 2/2023 |
| EP | 3 003 420 | 2/2023 |
| EP | 3 539 585 | 2/2023 |
| EP | 3 956 010 | 2/2023 |
| EP | 3 046 594 | 3/2023 |
| EP | 3 127 563 | 3/2023 |
| EP | 3 256 186 | 3/2023 |
| EP | 3 288 609 | 3/2023 |
| EP | 3 538 173 | 3/2023 |
| EP | 3 606 576 | 3/2023 |
| EP | 3 927 390 | 3/2023 |
| EP | 3 384 940 | 4/2023 |
| EP | 3 441 616 | 4/2023 |
| EP | 3 938 005 | 4/2023 |
| EP | 3 946 511 | 4/2023 |
| EP | 4 178 663 | 5/2023 |
| EP | 3 544 649 | 6/2023 |
| EP | 3 634 528 | 6/2023 |
| EP | 3 551 271 | 7/2023 |
| EP | 3 809 959 | 7/2023 |
| EP | 3 912 673 | 7/2023 |
| EP | 4 218 897 | 8/2023 |
| EP | 4 218 898 | 8/2023 |
| EP | 4 218 899 | 8/2023 |
| EP | 2 961 984 | 9/2023 |
| EP | 3 352 808 | 9/2023 |
| EP | 3 692 933 | 9/2023 |
| EP | 3 713 634 | 9/2023 |
| EP | 3 773 130 | 9/2023 |
| EP | 3 895 638 | 9/2023 |
| EP | 3 903 701 | 9/2023 |
| EP | 3 178 515 | 10/2023 |
| EP | 3 253 302 | 10/2023 |
| EP | 3 554 576 | 10/2023 |
| EP | 3 603 727 | 10/2023 |
| EP | 3 737 435 | 10/2023 |
| EP | 3 773 129 | 10/2023 |
| EP | 3 777 952 | 10/2023 |
| EP | 3 795 208 | 10/2023 |
| EP | 4 052 754 | 10/2023 |
| EP | 4 149 606 | 10/2023 |
| EP | 3 157 596 | 11/2023 |
| EP | 3 515 525 | 11/2023 |
| EP | 3 583 927 | 11/2023 |
| EP | 3 621 669 | 11/2023 |
| EP | 3 744 362 | 11/2023 |
| EP | 3 766 428 | 11/2023 |
| EP | 3 773 363 | 11/2023 |
| EP | 3 808 390 | 11/2023 |
| EP | 3 840 670 | 11/2023 |
| EP | 4 061 470 | 11/2023 |
| EP | 3 449 958 | 12/2023 |
| EP | 3 687 596 | 12/2023 |
| EP | 3 710 076 | 12/2023 |
| EP | 3 711 698 | 12/2023 |
| EP | 3 752 236 | 12/2023 |
| EP | 3 768 340 | 12/2023 |
| EP | 3 787 707 | 12/2023 |
| EP | 3 926 194 | 12/2023 |
| EP | 3 349 671 | 1/2024 |
| EP | 3 349 839 | 1/2024 |
| EP | 3 443 915 | 1/2024 |
| EP | 3 487 421 | 1/2024 |
| EP | 3 784 305 | 1/2024 |
| EP | 3 801 675 | 1/2024 |
| EP | 3 925 659 | 1/2024 |
| EP | 4 115 919 | 1/2024 |
| EP | 3 242 613 | 2/2024 |
| EP | 3 509 504 | 2/2024 |
| EP | 3 518 836 | 2/2024 |
| EP | 3 534 805 | 2/2024 |
| EP | 3 566 636 | 2/2024 |
| EP | 3 603 728 | 2/2024 |
| EP | 3 634 526 | 2/2024 |
| EP | 3 700 464 | 2/2024 |
| EP | 3 718 588 | 2/2024 |
| EP | 3 768 342 | 2/2024 |
| EP | 3 768 347 | 2/2024 |
| EP | 3 769 799 | 2/2024 |
| EP | 3 790 606 | 2/2024 |
| EP | 3 820 412 | 2/2024 |
| EP | 3 930 780 | 2/2024 |
| EP | 3 053 532 | 3/2024 |
| EP | 3 142 573 | 3/2024 |
| EP | 3 275 499 | 3/2024 |
| EP | 3 397 147 | 3/2024 |
| EP | 3 424 551 | 3/2024 |
| EP | 3 492 042 | 3/2024 |
| EP | 3 528 885 | 3/2024 |
| EP | 3 563 805 | 3/2024 |
| EP | 3 782 695 | 3/2024 |
| EP | 3 854 448 | 3/2024 |
| EP | 3 927 254 | 3/2024 |

(56) References Cited

FOREIGN PATENT DOCUMENTS

| | | |
|---|---|---|
| EP | 3 955 796 | 3/2024 |
| EP | 4 037 574 | 3/2024 |
| EP | 4 140 532 | 5/2024 |
| EP | 3 693 038 | 6/2024 |
| EP | 3 768 344 | 7/2024 |
| EP | 3 970 765 | 7/2024 |
| EP | 3 789 054 | 8/2024 |
| EP | 3 793 633 | 8/2024 |
| EP | 3 854 444 | 9/2024 |
| EP | 4 429 750 | 9/2024 |
| EP | 3 534 985 | 10/2024 |
| EP | 3 793 674 | 10/2024 |
| EP | 3 893 957 | 10/2024 |
| EP | 3 914 334 | 10/2024 |
| EP | 3 618 885 | 11/2024 |
| EP | 3 641 845 | 11/2024 |
| EP | 3 643 350 | 11/2024 |
| EP | 4 034 221 | 11/2024 |
| EP | 4 087 641 | 11/2024 |
| EP | 4 039 289 | 12/2024 |
| EP | 4 084 856 | 1/2025 |
| EP | 3 522 947 | 2/2025 |
| EP | 4 429 754 | 2/2025 |
| EP | 3 998 102 | 3/2025 |
| EP | 4 429 751 | 3/2025 |
| EP | 4 429 752 | 3/2025 |
| EP | 4 429 753 | 3/2025 |
| EP | 4 023 282 | 4/2025 |
| EP | 3 950 043 | 5/2025 |
| EP | 3 955 986 | 5/2025 |
| EP | 3 958 921 | 5/2025 |
| EP | 3 990 047 | 5/2025 |
| EP | 4 218 900 | 5/2025 |
| EP | 4 429 755 | 5/2025 |
| EP | 4 039 319 | 6/2025 |
| FR | 1458525 | 3/1966 |
| FR | 2 768 056 | 3/1999 |
| GB | 0 648 739 | 1/1951 |
| GB | 2 213 541 | 8/1989 |
| GB | 2 345 387 | 7/2000 |
| GB | 2 451 161 | 12/2011 |
| GB | 2 545 062 | 6/2017 |
| GB | 2 545 750 | 6/2017 |
| JP | S59-076463 | 5/1984 |
| JP | 59-119788 | 8/1984 |
| JP | S61-500059 | 1/1986 |
| JP | S62-113555 | 7/1987 |
| JP | S64-68236 | 3/1989 |
| JP | H02-055886 | 2/1990 |
| JP | 2-79738 | 3/1990 |
| JP | H04-176471 | 6/1992 |
| JP | H04-108384 | 9/1992 |
| JP | H08-057042 | 3/1996 |
| JP | H09-028664 | 2/1997 |
| JP | H10-052489 | 2/1998 |
| JP | 2888609 | 5/1999 |
| JP | 2889384 | 5/1999 |
| JP | H11-239617 | 9/1999 |
| JP | 2001-037728 | 2/2001 |
| JP | 2001-515374 | 9/2001 |
| JP | 2001-515375 | 9/2001 |
| JP | 2003-019197 | 1/2003 |
| JP | 2003-525438 | 8/2003 |
| JP | 2003-528697 | 9/2003 |
| JP | 2004-019468 | 1/2004 |
| JP | 2004-278375 | 10/2004 |
| JP | 2005-028137 | 2/2005 |
| JP | 2005-507039 | 3/2005 |
| JP | 2008-511414 | 4/2008 |
| JP | 2008-516654 | 5/2008 |
| JP | 2010-518907 | 6/2010 |
| JP | 2010-258181 | 11/2010 |
| JP | 2010-534080 | 11/2010 |
| JP | 2013-013216 | 1/2013 |
| JP | 2013-519497 | 5/2013 |
| JP | 2014-004303 | 1/2014 |
| JP | 2014-524274 | 9/2014 |
| JP | 2015-514529 | 5/2015 |
| JP | 2015-514531 | 5/2015 |
| JP | 2015-122448 | 7/2015 |
| JP | 2016-002466 | 1/2016 |
| JP | 2016-532500 | 10/2016 |
| JP | 6063151 | 1/2017 |
| JP | 6267625 | 1/2018 |
| JP | 2018-057878 | 4/2018 |
| JP | 2019-516458 | 6/2019 |
| JP | 6572056 | 9/2019 |
| JP | 2020-072985 | 5/2020 |
| JP | 2020-523090 | 8/2020 |
| JP | 2018-510708 | 3/2021 |
| KR | 10-2011-0098192 | 9/2011 |
| RO | 131676 | 2/2017 |
| RU | 2 051 695 | 1/1996 |
| TW | 374317 | 11/1999 |
| UA | 97202 C2 | 1/2012 |
| WO | WO 94/009835 | 5/1994 |
| WO | WO 97/037696 | 10/1997 |
| WO | WO 97/037697 | 10/1997 |
| WO | WO 97/039785 | 10/1997 |
| WO | WO 99/049912 | 10/1999 |
| WO | WO 00/033446 | 6/2000 |
| WO | WO 02/022200 | 3/2002 |
| WO | WO 02/041935 | 5/2002 |
| WO | WO 02/070039 | 9/2002 |
| WO | WO 03/075981 | 9/2003 |
| WO | WO 03/103745 | 12/2003 |
| WO | WO 2005/007024 | 1/2005 |
| WO | WO 2005/020848 | 3/2005 |
| WO | WO 2005/028014 | 3/2005 |
| WO | WO 2005/037345 | 4/2005 |
| WO | WO 2007/006055 | 1/2007 |
| WO | WO 2007/033933 | 3/2007 |
| WO | WO 2007/044510 | 4/2007 |
| WO | WO 2007/105842 | 9/2007 |
| WO | WO 2008/017289 | 2/2008 |
| WO | WO 2008/081783 | 7/2008 |
| WO | WO 2008/106103 | 9/2008 |
| WO | WO 2009/010888 | 1/2009 |
| WO | WO 2009/046789 | 4/2009 |
| WO | WO 2009/046790 | 4/2009 |
| WO | WO 2009/073037 | 6/2009 |
| WO | WO 2009/114456 | 9/2009 |
| WO | WO 2010/014418 | 2/2010 |
| WO | WO 2010/092347 | 8/2010 |
| WO | WO 2010/119267 | 10/2010 |
| WO | WO 2011/003043 | 1/2011 |
| WO | WO 2011/081626 | 7/2011 |
| WO | WO 2011/096975 | 8/2011 |
| WO | WO 2011/160858 | 12/2011 |
| WO | WO 2012/018917 | 2/2012 |
| WO | WO 2012/047540 | 4/2012 |
| WO | WO 2012/112129 | 8/2012 |
| WO | WO 2013/013248 | 1/2013 |
| WO | WO 2013/037380 | 3/2013 |
| WO | WO 2013/092971 | 6/2013 |
| WO | WO 2013/093058 | 6/2013 |
| WO | WO 2013/120957 | 8/2013 |
| WO | WO 2013/167432 | 11/2013 |
| WO | WO 2013/173239 | 11/2013 |
| WO | WO 2014/042925 | 3/2014 |
| WO | WO 2014/096408 | 6/2014 |
| WO | WO 2015/019132 | 2/2015 |
| WO | WO 2015/039605 | 3/2015 |
| WO | WO 2015/063281 | 5/2015 |
| WO | WO 2015/085076 | 6/2015 |
| WO | WO 2015/109028 | 7/2015 |
| WO | WO 2015/172173 | 11/2015 |
| WO | WO 2015/175718 | 11/2015 |
| WO | WO 2016/028644 | 2/2016 |
| WO | WO 2016/055368 | 4/2016 |
| WO | WO 2016/137743 | 9/2016 |
| WO | WO 2016/146661 | 9/2016 |
| WO | WO 2016/146663 | 9/2016 |
| WO | WO 2017/004175 | 1/2017 |

(56) References Cited

FOREIGN PATENT DOCUMENTS

| | | |
|---|---|---|
| WO | WO 2017/015764 | 2/2017 |
| WO | WO 2017/021465 | 2/2017 |
| WO | WO 2017/053988 | 3/2017 |
| WO | WO 2017/060257 | 4/2017 |
| WO | WO 2017/112695 | 6/2017 |
| WO | WO 2017/112698 | 6/2017 |
| WO | WO 2017/118738 | 7/2017 |
| WO | WO 2017/147103 | 8/2017 |
| WO | WO 2017/147291 | 8/2017 |
| WO | WO 2017/157884 | 9/2017 |
| WO | WO 2017/159849 | 9/2017 |
| WO | WO 2017/162619 | 9/2017 |
| WO | WO 2017/194562 | 11/2017 |
| WO | WO 2017/205909 | 12/2017 |
| WO | WO 2018/007120 | 1/2018 |
| WO | WO 2018/036927 | 3/2018 |
| WO | WO 2018/039479 | 3/2018 |
| WO | WO 2018/088939 | 3/2018 |
| WO | WO 2018/078615 | 5/2018 |
| WO | WO 2018/081040 | 5/2018 |
| WO | WO 2018/089970 | 5/2018 |
| WO | WO 2018/109038 | 6/2018 |
| WO | WO 2018/139508 | 8/2018 |
| WO | WO 2018/165519 | 9/2018 |
| WO | WO 2018/197306 | 11/2018 |
| WO | WO 2018/202779 | 11/2018 |
| WO | WO 2018/234454 | 12/2018 |
| WO | WO 2019/034670 | 2/2019 |
| WO | WO 2019/035804 | 2/2019 |
| WO | WO 2019/038343 | 2/2019 |
| WO | WO 2019/038345 | 2/2019 |
| WO | WO 2019/055591 | 3/2019 |
| WO | WO 2019/057636 | 3/2019 |
| WO | WO 2019/067233 | 4/2019 |
| WO | WO 2019/078723 | 4/2019 |
| WO | WO 2019/135767 | 7/2019 |
| WO | WO 2019/137911 | 7/2019 |
| WO | WO 2019/138350 | 7/2019 |
| WO | WO 2019/145253 | 8/2019 |
| WO | WO 2019/158996 | 8/2019 |
| WO | WO 2019/161245 | 8/2019 |
| WO | WO 2019/180104 | 9/2019 |
| WO | WO 2019/180179 | 9/2019 |
| WO | WO 2019/180181 | 9/2019 |
| WO | WO 2019/191245 | 10/2019 |
| WO | WO 2019/193604 | 10/2019 |
| WO | WO 2018/135477 | 11/2019 |
| WO | WO 2018/135478 | 11/2019 |
| WO | WO 2019/211410 | 11/2019 |
| WO | WO 2019/219868 | 11/2019 |
| WO | WO 2019/219871 | 11/2019 |
| WO | WO 2019/219872 | 11/2019 |
| WO | WO 2019/219874 | 11/2019 |
| WO | WO 2019/219876 | 11/2019 |
| WO | WO 2019/219881 | 11/2019 |
| WO | WO 2019/219882 | 11/2019 |
| WO | WO 2019/219883 | 11/2019 |
| WO | WO 2019/219884 | 11/2019 |
| WO | WO 2019/219885 | 11/2019 |
| WO | WO 2019/229206 | 12/2019 |
| WO | WO 2019/229207 | 12/2019 |
| WO | WO 2019/229210 | 12/2019 |
| WO | WO 2019/229211 | 12/2019 |
| WO | WO 2019/229214 | 12/2019 |
| WO | WO 2019/229220 | 12/2019 |
| WO | WO 2019/229221 | 12/2019 |
| WO | WO 2019/229222 | 12/2019 |
| WO | WO 2019/229223 | 12/2019 |
| WO | WO 2019/229224 | 12/2019 |
| WO | WO 2019/234146 | 12/2019 |
| WO | WO 2019/239259 | 12/2019 |
| WO | WO 2019/241556 | 12/2019 |
| WO | WO 2019/243582 | 12/2019 |
| WO | WO 2019/243588 | 12/2019 |
| WO | WO 2020/003110 | 1/2020 |
| WO | WO 2020/011760 | 1/2020 |
| WO | WO 2020/011795 | 1/2020 |
| WO | WO 2020/011797 | 1/2020 |
| WO | WO 2020/016438 | 1/2020 |
| WO | WO 2020/028312 | 2/2020 |
| WO | WO 2020/028537 | 2/2020 |
| WO | WO 2020/030700 | 2/2020 |
| WO | WO 2020/064911 | 4/2020 |
| WO | WO 2020/073047 | 4/2020 |
| WO | WO 2020/123333 | 6/2020 |
| WO | WO 2020/132211 | 6/2020 |
| WO | WO 2020/137708 | 7/2020 |
| WO | WO 2020/176236 | 9/2020 |
| WO | WO 2020/187797 | 9/2020 |
| WO | WO 2020/219430 | 10/2020 |
| WO | WO 2020/234785 | 11/2020 |
| WO | WO 2020/242881 | 12/2020 |
| WO | WO 2020/264174 | 12/2020 |
| WO | WO 2021/046275 | 3/2021 |
| WO | WO 2021/062265 | 4/2021 |
| WO | WO 2021/067691 | 4/2021 |
| WO | WO 2021/119478 | 6/2021 |
| WO | WO 2021/150777 | 7/2021 |
| WO | WO 2021/152013 | 8/2021 |
| WO | WO 2023/040546 | 12/2021 |
| WO | WO 2022/011095 | 1/2022 |
| WO | WO 2022/032286 | 2/2022 |
| WO | WO 2022/056542 | 3/2022 |
| WO | WO 2022/063650 | 3/2022 |
| WO | WO 2022/072944 | 4/2022 |
| WO | WO 2022/076862 | 4/2022 |
| WO | WO 2022/076948 | 4/2022 |
| WO | WO 2022/091784 | 5/2022 |
| WO | WO 2022/109589 | 5/2022 |
| WO | WO 2022/109590 | 5/2022 |
| WO | WO 2022/109591 | 5/2022 |
| WO | WO 2022/173970 | 8/2022 |
| WO | WO 2022/174249 | 8/2022 |
| WO | WO 2023/226779 | 9/2022 |
| WO | WO 2023/003937 | 1/2023 |
| WO | WO 2023/278599 | 1/2023 |
| WO | WO 2023/014742 | 2/2023 |
| WO | WO 2023/049813 | 3/2023 |
| WO | WO 2024/160098 | 4/2023 |
| WO | WO 2023/076869 | 5/2023 |
| WO | WO 2024/125157 | 5/2023 |
| WO | WO 2023/112044 | 6/2023 |
| WO | WO 2023/230157 | 11/2023 |
| WO | WO 2024/104184 | 5/2024 |
| WO | WO 2024/243154 | 11/2024 |
| WO | WO 2025/075927 | 4/2025 |

OTHER PUBLICATIONS

Gopinath, Divya. A System for Impedance Characterization of Coronary Stents. Diss. University of Strathclyde, 2015, doi:10. 48730/ET6B-GH64. (Year: 2015).*

International Search Report and Written Opinion received in PCT Application No. PCT/EP2019/068346, dated Sep. 26, 2019 in 16 pages.

International Preliminary Report on Patentability and Written Opinion received in PCT Application No. PCT/EP2019/068346, dated Sep. 16, 2020 in 26 pages.

"ABMD—Taking a Closer Look at Impella ECP as the Pivotal Trial Gets Underway", Guggenheim, Press Release, Mar. 29, 2022, pp. 4.

Vollkron et al., "Advanced Suction Detection for an Axial Flow Pump", Artificial Organs, 2006, vol. 30, No. 9, pp. 665-670.

Vollkron et al., "Development of a Suction Detection System for Axial Blood Pumps", Artificial Organs, 2004, vol. 28, No. 8, pp. 709-716.

"Edwards SAPIEN 3 Kit—Transapical and Transaortic", Edwards Lifesciences, Released Nov. 8, 2016, p. 11. chrome-extension:// efaidnbmnnnibpcajpcglclefindmkaj/https://edwardsprod.blob.core. windows.net/media/De/sapien3/doc-0045537b%20-%20certitude. pdf.

Escudeiro et al., "Tribological behavior of uncoated and DLC-coated CoCr and Ti-alloys in contact with UHMWPE and PEEK counterbodies;" Tribology International, vol. 89, 2015, pp. 97-104.

(56) References Cited

OTHER PUBLICATIONS

Hinkel et al., "Pump Reliability and Efficiency Increase Maintenance Program—Utilizing High Performance Thermoplastics;" Proceedings of the 16th International Pump Users Symposium, Texas A&M University. Turbomachinery Laboratories; 1999, pp. 115-120.
Neale, Michael J., "The Tribology Handbook;" 1999, Butterworth-Heinemann, Second Edition, pp. 582.
Sak et al., "Influence of polyetheretherketone coatings on the Ti-13Nb-13Zr titanium alloy's bio-tribological properties and corrosion resistance;" Materials Science and Engineering: C, vol. 63, 2016, pp. 52-61.
"Transvalvular Insertion Tool (TVI)", Pressure Products, Febuary 2013, https://www.pressure-products.com/wip/tvi.html, as printed Jul. 25, 2024 in 2 pages.
Ai, X. (2013). Radial Bearings. In: Wang, Q.J., Chung, YW. (eds) Encyclopedia of Tribology. Springer, Boston, MA https://doi.org/10.1007/978-0-387-92897-5_334, accessed Oct. 18, 2024, pp. 4.
GGB by Timken Bearings FAQ; "What is a Slide Bearing?;" https://www.ggbearings.com/en/why-choose-ggb/faq/bearings-faq/what-slide-bearing; accessed Oct. 10, 2024, pp. 1.
Google.com, "Spider Bearing—Search Results;" https://www.google.com/search?q=spider+bearing&rlz=X1C1GCEA_enUS1059US1059&oq=spider+beari&gs_lcrp=EgZjaHJvbWUqCQgAEEUYOxiABDIJCAAQRRg7GIAEMgYIARBFGDkyBwgCEAAYgAQyBwgDEAAYgAQyBwgEEAAYgAQyBwgFEAAYgAQyBwgGEAAYgAQyBggHEEUYPKgCALACAA&sourceid=chrome&ie=UTF-8, accessed Oct. 18, 2024, pp. 4.
McMaster-Carr Online Catalog, "Bearings search results;" https://www.mcmaster.com/products/bearings/; accessed Oct. 18, 2024, pp. 5.
McMaster-Carr Online Catalog, "Slide Bearings search results;" https://www.mcmaster.com/products/slide-bearings/; accessed Oct. 18, 2024, pp. 21.
RBCbearings.com, "RBC Bearings Incorporated—Products;" https://www.rbcbearings.com/Products; accessed Oct. 18, 2024, pp. 2.
SKF.com; "Products: Bearings;" https://www.skf.com/us/products/bearings; accessed Oct. 18, 2024, pp. 8.
Wikipedia, "Plain Bearing," https://en.wikipedia.org/wiki/Plain_bearing; accessed Oct. 18, 2024, pp. 10.
Bergersen et al., "Congenital Heart Disease: The Catheterization Manual", Netherlands, Springer, 2009, pp. 115-118 and 143-150.
Delgado et al., "Interventional Treatment of Advanced Ischemic Heart Disease", Percutaneous Mechanical Assist Devices, Ch. 6, Springer, 2009, pp. 85-91.
Delgado et al., "Interventional Treatment of Advanced Ischemic Heart Disease", The Future of Treatment of Advanced Ischemic Heart Disease, Ch. 8, Springer, 2009, pp. 129-142.
Eeckhout, MD, PhD, et al., "Handbook of Complications During Percutaneous Cardiovascular Interventions", 2007 Informa UK Ltd., Ch. 12, pp. 167-177.
"FDA Approves Abiomed's Heart Pump Impella, Shares Rise", Reuters 2008 press release, Jun. 2, 2008, https://jp.reuters.com/article/us-abiomed/fda-approves-abiomeds-heart-pump-impella-shares-rise-idUSBNG131420080602/, 1 page.
Lake et al., "Pediatric Cardiac Anesthesia", 4th Edition, 2005, Ch. 15, pp. 291-303.
Machiraju, Venkat R., "Redo Cardiac Surgery in Adults", Practical Approaches to the Current "On-Pump" Redo Coronary Artery Bypass Surgery, Ch. 2, Springer, 2012, pp. 7-19.
Machiraju, Venkat R., "Redo Cardiac Surgery in Adults", Options for Advanced Mechanical Support for Cardiogenic Shock Complicating Cardiac Reoperations, Ch. 9, Springer, 2012, pp. 67-80.
Machiraju, Venkat R., "Redo Cardiac Surgery in Adults", Percutaneous Approaches to Valvular Heart Disease After Previous Cardiac Surgery, Ch. 21, Springer, 2012, pp. 195-200.
Parrillo et al., "Critical Care Medicine", Principles of Diagnosis and Management in the Adult, Elsevier, 4th Edition, 2014, Chapters 4 & 29, pp. 47-58.e1 and 442-469.e4.
Vincent, MD, PhD, et al., "Textbook of Critical Care", Acute Coronary Syndromes: Therapy, Elsevier, 7th Edition, Ch. 78, 2017, pp. 520-531.e3.
Vincent, MD, PhD, et al., "Textbook of Critical Care", Mechanical Support in Cardiogenic Shock, Elsevier, 7th Edition, Ch. 91, 2017, pp. 637-648.e3.

\* cited by examiner

CARDIAC ASSIST SYSTEM, AND METHOD FOR MONITORING THE INTEGRITY OF A RETAINING STRUCTURE OF A CARDIAC ASSIST SYSTEM

BACKGROUND

Field

The disclosure relates to a cardiac support system having a retaining structure for the cardiac support system and a method for monitoring the integrity of a retaining structure of a cardiac support system.

Description of the Related Art

So-called cardiac support systems or left ventricular assist devices are known options for supporting the pumping function of the heart. These are surgically implantable mechanical pumps that support the heart. Rotary blood pumps are used, for example, which can in particular also be inserted in a minimally invasive manner, for example into the left ventricle and into the aorta. To anchor such cardiac support systems, retaining structures are often provided which, as it were, clamp the cardiac support system in place at the intended position.

Such cardiac support systems are subjected to considerable stresses, including mechanical stresses, during their lifetime. Therefore, in the past, medical implants of this type were generally designed to be extremely robust and material-intensive, so that, even in extreme situations, mechanical failures hardly ever occurred. The size and weight of such systems required apical implantation on an open heart, however, which was associated with corresponding risks for the patient. Recent developments have focused on reducing the size, so that systems have been developed that can be placed transfemorally or transaortally in a minimally invasive manner without opening the chest, for example in aortic valve position between the ventricle and the aorta. Since this procedure does not allow surgical positional fixation as in earlier systems, a stent-like anchoring structure or retaining structure which fixes the cardiac support system firmly in aortic valve position is used to prevent displacement of the system. When such systems are used in an intensive care setting, monitoring of the pump position is assured as part of intensive care patient monitoring.

SUMMARY

The underlying object of the disclosure is to further improve the systems and methods known in the state of the art and identify critical system states as early as possible.

The disclosure provides a cardiac support system having a retaining structure for the cardiac support system, wherein the cardiac support system comprises a device for monitoring the integrity of the retaining structure. This cardiac support system significantly improves the safety of minimally invasive implantable systems that are placed between the ventricle and the aorta, for example, without surgical positional fixation. Using the device for monitoring the integrity of the retaining structure provided, the correct functioning of the retaining structure can be monitored over the long term. This is particularly true even if the cardiac support system is used for chronic patient care and the patient returns to his usual daily routine, for example, which makes intensive care patient monitoring impossible. Monitoring the integrity of the retaining structure ensures that the cardiac support system remains fixed in its intended position where it can perform its proper function. If changes in the structural integrity of the retaining structure are detected by means of the monitoring device, it is possible to react to them in good time before medical complications occur.

The retaining structure can be a stent structure, by means of which the actual cardiac support system is clamped, as it were, and thus fixed in the intended position in the body. The retaining structure can be configured as a ring, whereby the structure is formed by a mesh made of wire material, for example. In other configurations, the stent structure can be tube-shaped and produced by laser cutting, for example. Nickel-titanium alloys, which can be used advantageously in medical technology due to their shape memory properties, are particularly suitable for this purpose. The retaining structure can comprise a plurality of segments or elements. It is, for example, in particular possible to provide two or more retaining arms (webs) that hold a ring (crown) which is equipped with legs for clamping in the respective position. This structure can be attached to the actual cardiac support system by means of one or more connection elements. The actual cardiac support system can in particular be a blood pump based on the rotary pump principle, which comprises an impeller cage in which there is a flow machine or an impeller for conveying the blood and which comprises openings for delivering the blood, for example, into the aorta. There is also an inlet cage, through which the blood is passed into the interior of the, for example tubular, system. The flow machine or the impeller is driven by an electric motor. The system is connected to a supply cable, via which the support system is electrically connected, for example to an implanted or extracorporeal control and/or supply device.

In an embodiment of the cardiac support system, the device for monitoring the retaining structure comprises at least one actuator-sensor combination. A variety of embodiments of this are possible. An actuator-sensor combination can in particular also be understood to be devices that combine the actuator function and the sensor function in one component. In a first configuration, the monitoring is based on an evaluation of sound signals, in particular ultrasonic signals. For this purpose, the device comprises at least one ultrasonic element. This allows mechanical resonances to be excited in the retaining structure and measured by means of a receiver (sensor). The eigenmodes or natural oscillations excited in this manner can be used to detect signs of aging or damage in the retaining structure, so that, for example, deformations or position changes (damping) can be detected. The evaluation can be based on a modal analysis, overelevations of characteristic resonances and/or a frequency-dependent transfer function, or something similar. The use of a sound element, and in particular an ultrasonic transducer or ultrasonic element, enables a wear-free sensor principle and generally does not require any adjustments to the retaining structure itself. Another advantage is that ultrasound measurement technology is often already used in the actual cardiac support system, for example for ultrasound-based flow sensors. With appropriate adjustments, such a system can be configured such that the ultrasonic element can be used as a device for monitoring the integrity of the retaining structure, whereby usually only a small amount of additional circuitry is needed. In an embodiment, the at least one ultrasonic element is a bidirectional ultrasonic element. A bidirectional ultrasonic element combines the transmitter and the receiver in one unit and has the advantage that there is no need for two separate ultrasonic elements for sending and receiving. In a single ultrasonic element, voltage can be converted into vibration and the resulting vibration can be converted back to voltage. This combination is very advantageous, in particular in terms of saved installation space.

In another configuration, the monitoring device comprises at least one means for coupling a current, whereby in particular a capacitive current coupling can be provided. In this configuration, the current is coupled into the retaining structure, whereby an evaluation can in particular be carried out on the principle of an impedance analysis. For this purpose, it can be provided that the retaining structure itself is adapted to an optimization of the resulting current paths. This configuration of the cardiac support system does not require ultrasound measurement technology or other complex measurement techniques, whereby this configuration is particularly suitable for systems that are not equipped with ultrasound measurement technology for the actual function of the cardiac support system. Electrodes are expediently provided to implement this configuration, in particular capacitive electrodes. The electrodes can be disposed on the surface of the cardiac support system, for example, in particular in the region of a connection element with which the actual retaining structure is attached to the actual cardiac support system. In some embodiments, a small alternating current is coupled into the retaining structure via such capacitive electrodes. High-frequency currents are particularly suitable. The coupled current is divided into partial currents based on the conductivity of the individual elements of the retaining structure. Constrictions, which guide the division of the coupled current into partial current flows, can be provided in the retaining structure. A suitable arrangement of the individual elements of the retaining structure (connection elements, web segments, crown or ring segments, etc.) leads to the division of the individual partial current flows, whereby a parallel circuit can be generated in a resulting electrical equivalent circuit diagram. An evaluation can be carried out on the basis of a total impedance that can be recorded by an impedance measuring device. If there is damage, for example if a web breaks, the respective impedance of the affected component increases, so that said damage can be detected by the impedance analysis. An impedance increase can therefore result from an interrupted or even only reduced conductor cross-section. For example, hairline cracks in the surface corrosion, for example in a nickel-titanium alloy, or other damage, can be detected in this manner as well. Continuous monitoring of the total impedance can therefore be used to continuously observe the structural integrity, and with it the functionality, of the retaining structure. High-frequency currents are particularly suitable. The higher the frequency of the current, the lower the series impedance of the coupling capacitor. As a result, sufficient current flow to obtain a sufficient signal-to-noise ratio is produced even at low voltages. Some frequencies are in the range of a few kilohertz, for example; for example in the range between about 1 kHz and about 100 kHz.

In a further configuration of the cardiac support system, the device for monitoring the retaining structure can comprise electrical conductor tracks (sensor conductor tracks), which are independent of a conductivity of the actual retaining structure itself. This configuration is particularly suitable, for example, for retaining structures made of non-conductive material, for example for retaining structures made of plastics (polymers or other), but also for retaining structures made of a principally conductive material. The electrical conductor tracks can be placed on and/or inserted into the retaining structure. Lithographic surface coatings, for example, or application of the conductor tracks by screen printing or dispensing a conductive material can be used to place or insert the electrically conductive conductor tracks. The sensor conductor tracks can also have a meandering configuration, for example. Expediently, an insulating surface is produced after the electrical conductor tracks are placed. For the aforementioned embodiment, too, in which the retaining structure itself is used as a conductive structure, electrical insulation is generally expedient to prevent the occurrence of short circuits resulting from the conductivity of the surrounding blood. Parylene C, for example, or other per se known electrical insulation materials can be used to produce an electrically insulating coating. Before placing the electrically conductive conductor tracks, it can be expedient to first ground the actual retaining structure in an insulating manner prior to placing the conductor tracks. The insulating surface can be produced after the conductor tracks have been placed.

Mounting conductor tracks on the retaining structure makes it possible to implement a variety of conductor track arrangements. For example, a single continuous electrical conductor can be routed from the coupling point of the current via a connection element, a web segment, the ring (crown) of the retaining structure to the opposite connection element. The resulting electrical equivalent circuit diagrams can map a series circuit, for example, so that an evaluation of the resulting electrical signals can be carried out accordingly. A maximum impedance increase ($Z_G \rightarrow \infty$) can be achieved with a pure series circuit, for example. In a variant with two webs (web segments), for example, an impedance Z_parallel=½ Z_web is established. If a web breaks, the parallel path is lost (one parallel path→∞) and the impedance increases to Z_parallel=Z_web. If Z_web=20 ohms, for example, the difference between normal state and break is only 10 ohms. The impedance for a series circuit Z_series=2 Z_web, in this example 40 Ohm. If a conductor breaks, the impedance increases to Z_series→∞. The crack or break thus causes a much larger signal swing, as a result of which said crack or break is very easy to measure. The more parallel paths there are, the smaller the signal swing caused by the break in a current path. It is therefore particularly advantageous to place only one conductor track which is routed as a series resistor across all components.

The disclosure further includes a method for monitoring the integrity of a retaining structure of a cardiac support system. An evaluation of detectable signals of an actuator-sensor combination is used here to infer the presence or possible absence of integrity of the retaining structure. In a particularly advantageous configuration of the method, the evaluation can be based on a vibration analysis, whereby the vibrations are produced using sound technology, in particular an ultrasound technology. In this configuration, therefore, the actuator-sensor combination is in particular a sound element and a corresponding sensor element. A piezo actuator can be used as a sound element to produce the sound vibrations, for example.

In another, likewise in some embodiments of the method, the evaluation is based on an impedance analysis, whereby the impedance is measured by means of a coupled current. A high-frequency current coupling is particularly suitable here. In this case, the analysis can be based on a measurement of the impedance, whereby the evaluation can be carried out using the total impedance, for example. The actuator-sensor combination in this configuration is thus in particular formed by one or more coupling electrodes for coupling the current on the one side and the impedance measuring device on the other side. For the analysis of the impedance as a complex electrical resistance, for example, a voltage of a defined amplitude and defined frequency, for example 3 V at 50 kHz, is connected to the coupling electrodes. Depending on the impedance, a current flow of a few µA or mA results. The impedance Z(jw) can be determined with Ohm's law Z(jw)=u(jw)/i(jw).

In other configurations of the method and the device or the cardiac support system, the monitoring of the integrity of the retaining structure can be based on an analysis of a total capacitance (against blood), for example, a series inductance or a characteristic resonance frequency having a characteristic quality resulting from the coupling capacitance, the series inductance and the series resistance.

In some embodiments of the method, the evaluation can be based on an examination of the integrity of electrical conductor tracks that are located on and/or in the retaining structure. Here too, current is coupled in and, in principle, the current flow is measured, so that, for example, a break in the retaining structure can be detected. With respect to further features of these different configurations of the method, reference is again made to the above description. The method can be implemented with a cardiac support system as described above.

BRIEF DESCRIPTION OF THE DRAWINGS

Further features and advantages of the disclosure emerge from the following description of design examples in conjunction with the drawings. The individual features can be realized individually or in combination with one another.

The drawings show.

DETAILED DESCRIPTION

Figure 1:
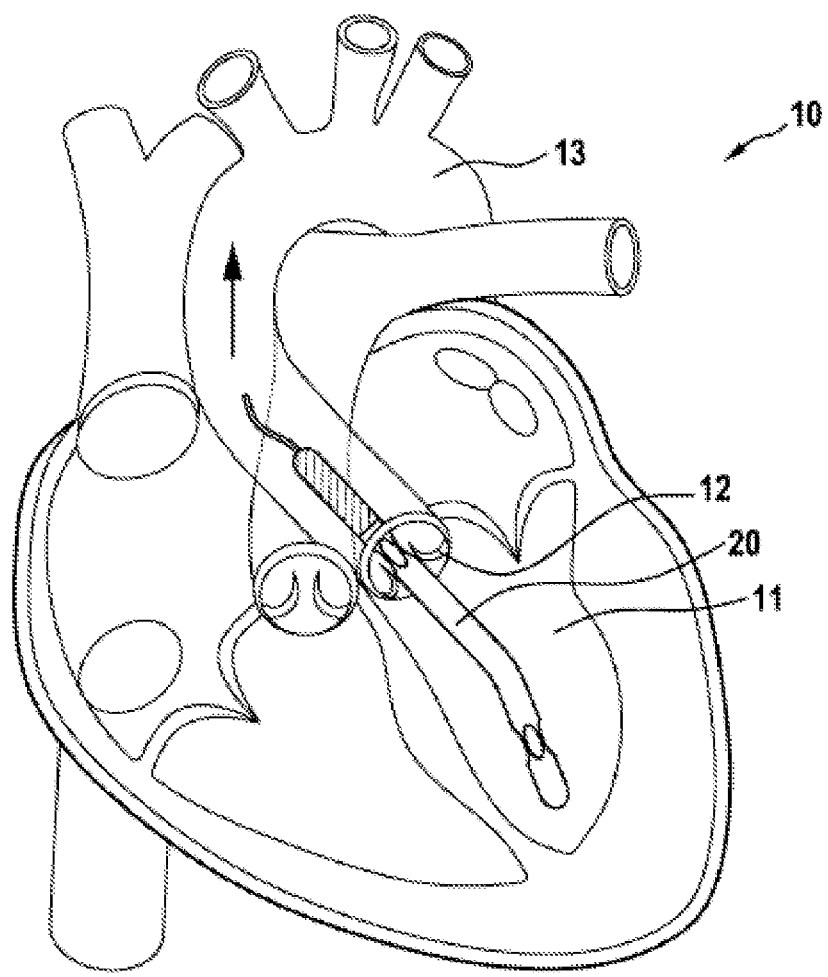
FIG. 1 a schematic sectional view of a human heart with an implanted cardiac support system (blood pump)

FIG. 1 shows a human heart 10, with a tubular cardiac support system 20 inserted in aortic valve position, i.e. between the ventricle (left ventricle) 11 and the aorta 13. The cardiac support system 20 is a blood pump that is implanted in a minimally invasive manner. The cardiac support system 20 extends with its tip into the ventricle 11 and passes through the aortic valves 12, so that the blood from the ventricle 11 is pumped into the aorta 13 (in the direction of the arrow) by means of the cardiac support system 20.

Figure 2:
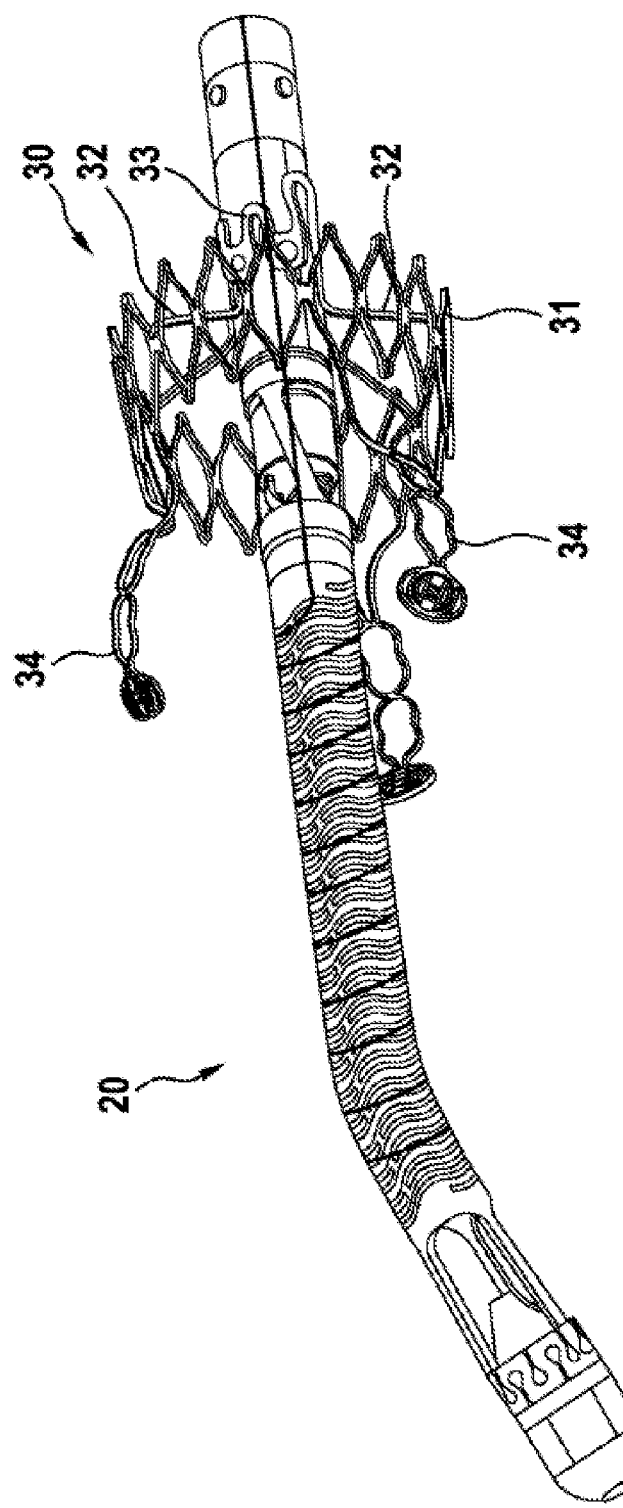
FIG. 2 a three-dimensional illustration of a cardiac support system with a retaining structure.
Figure 3:
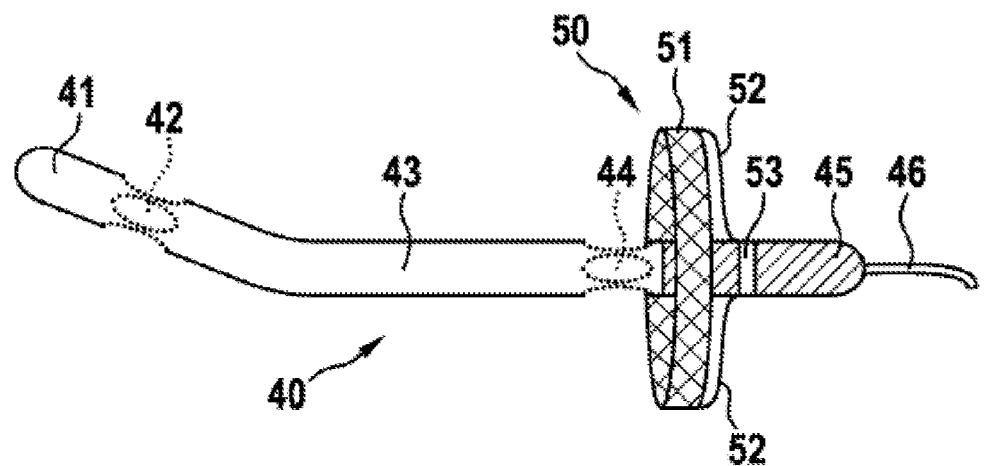
FIG. 3 a schematic line drawing of a cardiac support system with a retaining structure.

FIG. 2 shows further details of the per se known cardiac support system 20. The stent-like retaining structure 30 with which the cardiac support system 20 can be fixed in aortic valve position (see FIG. 1) is clearly visible. The retaining structure 30 comprises an annular ring or crown element 31, which is mounted via a plurality of retaining arms 32, which are attached to the actual cardiac support system 20 via a connection element 33. There are also two or more legs 34, by means of which the retaining structure and thus the entire cardiac support system is held or fixed in aortic valve position. These legs 34 can be omitted, if necessary, but the legs are generally advantageous because said legs can fix the system in the direction of rotation in a particularly stable manner. The retaining structure 30 can be produced by laser cutting the structure from a one-piece tube and then expanding it. Such a retaining structure can alternatively be produced as a wire mesh, for example. FIG. 3 shows a further configuration of a cardiac support system 40 in a schematic view, in which the retaining structure 50, as in the configuration in FIG. 2 (but without legs), comprises an annular ring structure 51, retaining arms 52 and a connection element 53 via which the entire retaining structure 50 is attached to the actual cardiac support system. The basic structure of a cardiac support system is explained in the following with reference to FIG. 3. Corresponding components are also present in the cardiac support system 20, which is shown in FIG. 2. The approximately tubular cardiac support system 40, which is an intravascular blood pump, comprises a tip 41 which may contain various sensors. The tip 41 is adjoined by an inlet cage 42, via which the blood is conducted, for example from the left ventricle into the interior of the cardiac support system 40. This is adjoined by a cannula 43 in which the blood continues to flow. The flow machine or an impeller which conveys the blood is disposed in the region of the impeller cage 44. The flow machine or the impeller is driven by an electric motor located in the region 45. The electric motor 45 is electrically supplied by means of a supply cable 46. Control and data transfer for the cardiac support system 40 takes place via the supply cable 46 as well, whereby the supply cable 46 is connected to an implanted or extracorporeal control and/or supply device (not shown here). The impeller cage 44 is provided with openings, through which the blood is released into or flows out of the aorta. For positioning and fixing purposes, the cardiac support system 40 is, as already discussed, equipped with a retaining structure 50, which is attached to the cardiac support system 40 via a connection element 53, for example in the region of the electric motor 45.

Conventional medical stents are often made from tubes of a nickel-titanium alloy by laser cutting. Conventional stents can alternatively be made of meshes of wire material, for example. Nickel-titanium alloys are particularly suitable for this wire material as well. Because nickel-titanium alloys have shape memory properties, these alloys are also particularly suitable for producing the retaining structure for the cardiac support system shown here. A desired shape can be "stored" in the material with the aid of a temperature process. The structure is strongly deformed in ice water, for example, and for example completely compressed, so that it can be inserted into the patient's body through a thin catheter. Contact with the warm blood activates the stored shape and the stent or the retaining structure unfolds to the embossed original shape.

In the cardiac support system of the disclosure, the integrity or intactness of the retaining structure is monitored. This solves the problem that the cardiac support system is subjected to mechanical stress with each heartbeat and that this continuous stress can cause deterioration or a defect, e.g. a break, in the retaining structure. This can have serious consequences, because the retaining structure is usually solely responsible for keeping the cardiac support system in position. The retaining structure can be monitored in a variety of ways, for example by coupling in a small current or by coupling in sound waves.

Figure 4:
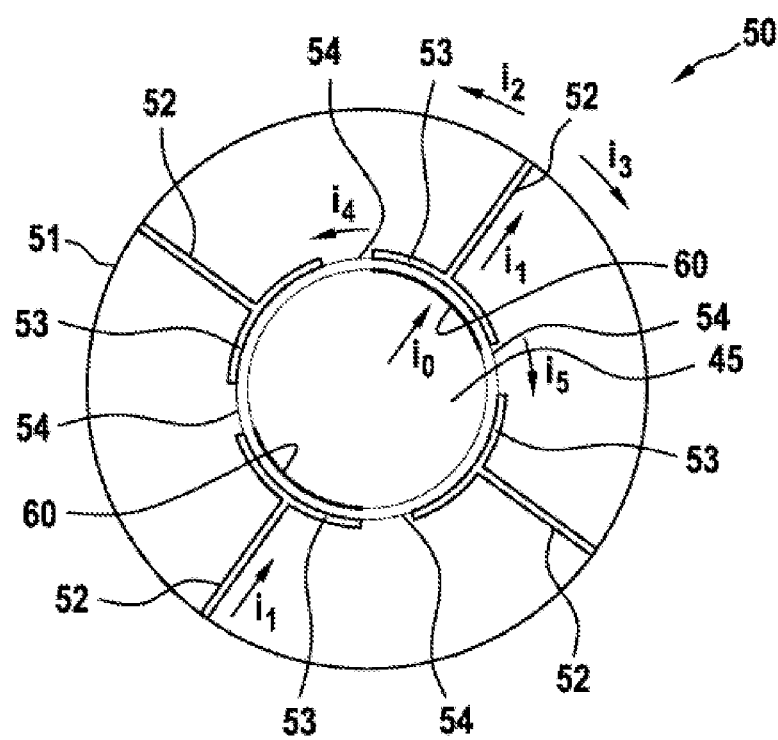
FIG. 4 a schematic cross-section through a cardiac support system in the region of the retaining structure to illustrate coupled current flows.

FIG. 4 shows the elements of the retaining structure 50 in a schematic manner in cross-section. The following explanations can also correspondingly be applied to the retaining system 30 of FIG. 2. FIG. 4 serves to explain the monitoring of the retaining structure, whereby a current is coupled into the retaining structure 50 and an impedance analysis is used to check the integrity of the retaining structure 50. The section shows the retaining structure 50, which is disposed in the region of the electric motor 45 of the cardiac support system. The connection element 53 is disposed directly on the housing of the region 45 in a ring shape. The retaining arms (webs) 52, which support the annular ring element 51, extend away from the connection element 53. A small alternating current is coupled into the retaining structure 50 via two capacitive electrodes 60. The electrodes 60 are located on the surface of the housing in the region 45, whereby correspondingly aligned parallel coupling surfaces are provided in the connection element 53. The current $i_0$ is coupled in via the electrodes 60. The coupled current $i_0$ is divided into the currents $i_1$, $i_4$ and $i_5$ based on the conductivity of the connection element 53. It is advantageous here for the connection element 53 to comprise constrictions 54. In this example, the connection element 53 is subdivided into four individual segments by the constrictions 54 and each segment is labeled with the reference sign 53. Due to the constrictions 54, the tangential electrical resistance for the current paths $i_4$ and $i_5$ is so large that a significant portion, for example at least 10% of the current, flows through the retaining arms 52 to the outer ring element 51 ($i_1$). In the ring element 51, the current flow $i_1$ is divided into the partial current flows $i_2$ and $i_3$, which flow around the outside in the direction of the counter electrode 60 on the opposite side of the electric motor housing (region 45). To prevent short circuits resulting from the conductivity of the surrounding blood, it is expedient to apply an electrically insulating coating to the retaining structure 50, for example with parylene C. This coating material has proven to be very advantageous in medical technology due to its good biocompatibility for a final production step. A coupling of the measurement current $i_0$ capacitively through the surface insulation layer is possible, whereby the layer structure between the coupling electrodes 60, the surface insulation layer and the connection element 53 corresponds to the cross-section through a so-called plate capacitor.

Figure 5:
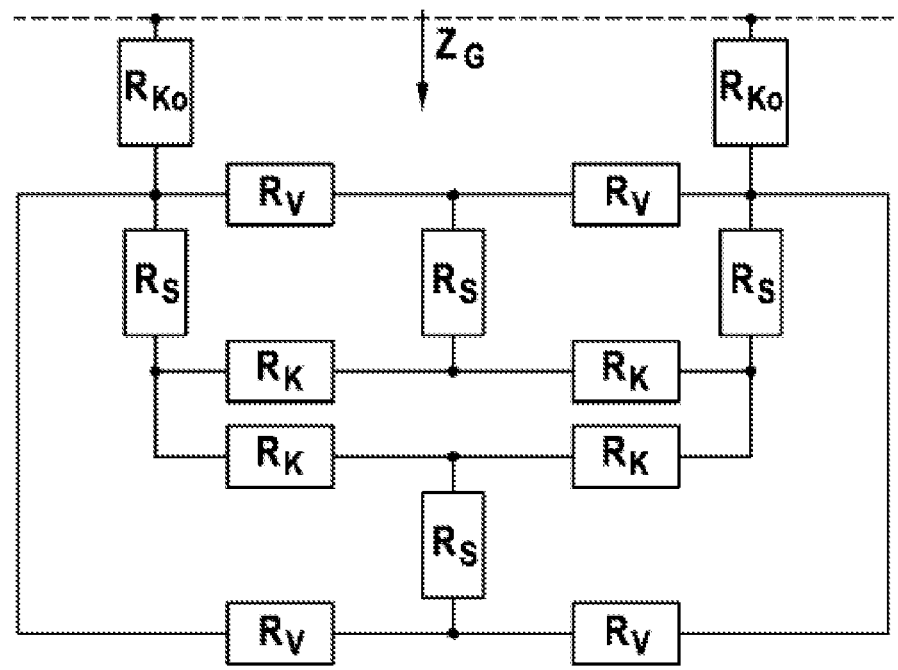
FIG. 5 the electrical equivalent circuit diagram resulting from FIG. 4.

The electrical equivalent circuit diagram resulting from FIG. 4 is shown in FIG. 5. The total impedance ZG can be recorded and monitored by an impedance measuring device not shown in more detail here. The integrity of the retaining structure 50 can be inferred from an evaluation of the total impedance ZG. The total impedance ZG is determined from the two coupling impedances RKO between the coupling electrodes 60 and the connection element 53. Added to this are components RV of the individual segments of the connection element 53 which are conductively connected to one another via the constrictions 54, components RS of the four retaining arms 52 (webs) and components RK of the four crown segments, which form the crown element 51. In the event of damage, for example a break or superficial damage to a connecting arm 52, the respective impedance of the affected component increases. Therefore, for example, by continuously monitoring the total impedance ZG, the structural integrity of the retaining structure 50 can correspondingly be inferred.

In a similar configuration of the retaining structure, it is not the retaining structure itself, i.e. for example a wire mesh, that is used as an electrical conductor; instead electrically conductive conductor tracks are placed on or inserted into the retaining structure. In this configuration, too, the integrity of the retaining structure can be inferred by coupling in a current and analyzing the resulting impedance. To produce such a retaining structure, the actual retaining structure can first be grounded in an insulating manner before placing the electrically conductive conductor tracks on it, for example by means of lithographic surface coating. Other options are screen printing or dispensing a conductive material. Finally, an insulating surface is expediently produced. Thus, for example, a single continuous conductor can be routed from a coupling electrode 60 via the connection element 53, a retaining arm 53 and the ring element 51 to the other coupling electrode 60 on the opposite side of the connection element 53. This eliminates the need for the parallel circuit shown in FIG. 5, which limits the value of the impedance swing in the event of a break in a parallel conductor. Such a pure series circuit enables a maximum impedance increase ($Z_G \rightarrow \infty$), so that a very simple analysis and evaluation can be carried out.

Figure 6:
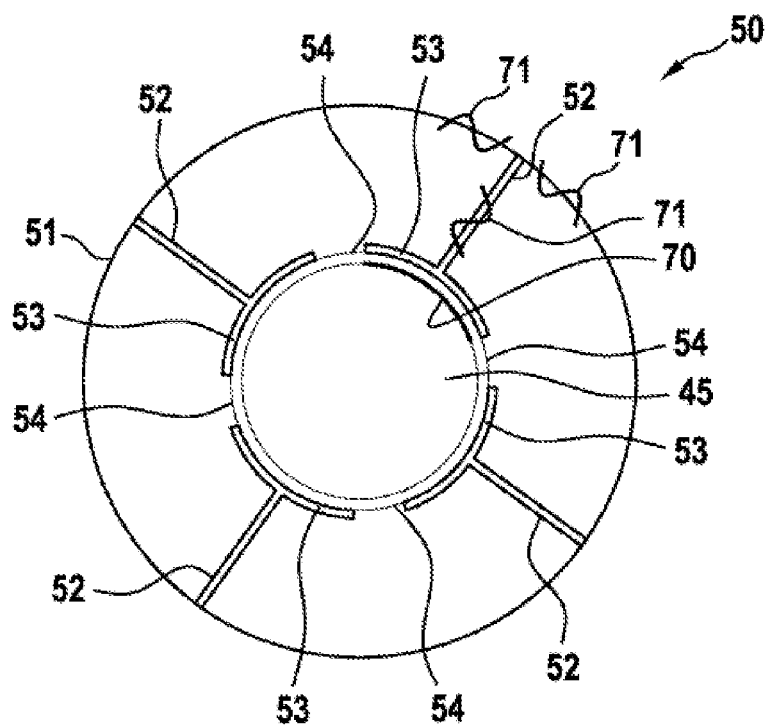
FIG. 6 a schematic cross-section through a cardiac support system in the region of the retaining structure to illustrate coupled vibrations.

FIG. 6 illustrates a further configuration for monitoring the integrity of the retaining structure. This figure again schematically shows the retaining structure 50 with the individual segments of the connection element 53, which are respectively separated from one another by constrictions 54. The retaining arms 52 and the outer, circumferential ring element 51 are shown as well. This configuration is based on a sound element 70, for example a piezo actuator, which excites mechanical resonances 71 in the retaining structure 50. The resonances can be measured by means of a receiver (sensor), whereby this receiver is not shown here in more detail and can be integrated in the actuator. The eigenmodes excited in this manner (modal analysis, overelevation of characteristic resonances, frequency-dependent transfer function or similar) or the natural oscillations and any changes that may occur are used to monitor signs of aging, for example, or damage or deformations or changes in position (damping).

The invention claimed is:

1. A cardiac support system comprising:
a retaining structure comprising:
an annular ring;
a connection element;
a first electrode disposed at a first annular position along the connection element;
a second electrode disposed at a second annular position along the connection element opposite the first annular position; and
one or more retaining arms extending between the annular ring and the connection element, wherein the one or more retaining arms comprises a first retaining arm extending from the first electrode to the annular ring and a second retaining arm extending from the second electrode to the annular ring;
an electrically insulating coating around the retaining structure configured to electrically insulate the retaining structure from electric charges external to the retaining structure; and
a device configured to monitor an integrity of the retaining structure;
wherein:
the first electrode is configured to pass an electrical current through the retaining structure along a current flow path to the second electrode;
the current flow path is configured to pass from the first electrode through the first retaining arm, the annular ring, and the second retaining arm to the second electrode; and
monitoring the integrity comprises measuring an electrical property of the retaining structure.

2. The cardiac support system of claim 1, wherein the retaining structure comprises a stent structure or a wire mesh structure.

3. The cardiac support system of claim 1, wherein the device comprises at least one actuator-sensor combination.

4. The cardiac support system of claim 1, wherein the device further comprises an ultrasonic element configured to vibrate the retaining structure and a sensor configured to measure vibrations of the retaining structure.

5. The cardiac support system of claim 1, wherein the retaining structure comprises constrictions configured to divide the electrical current into partial current flows.

6. The cardiac support system of claim 1, wherein the device comprises one or more electrical conductor tracks positioned on the retaining structure.

7. The cardiac support system of claim 1, wherein the device comprises one or more electrical conductor tracks inserted into the retaining structure.

8. The cardiac support system of claim 1, wherein the device is configured to measure an impedance of the electrical current through the connection element, one or more retaining arms, and the annular ring.

9. The cardiac support system of claim 1, wherein the electrical current is alternating current.

10. The cardiac support system of claim 9, wherein a frequency of the electrical current is above 1 kHz.

11. The cardiac support system of claim 1, wherein the electrical property is capacitance, series inductance, or resonance frequency.

12. The cardiac support system of claim 1, wherein the annular ring is expandable.

13. The cardiac support system of claim 1, wherein the one or more retaining arms further comprise a third retaining arm extending from the connection element to the annular ring and a fourth retaining arm extending from the connection element to the annular ring, wherein the third retaining arm is positioned halfway between the first retaining arm the second retaining arm and the fourth retaining arm is positioned opposite the third retaining arm.

14. The cardiac support system of claim 13, wherein each of the third retaining arm and the fourth retaining arm are electrically isolated from the first retaining arm and the second retaining arm.

15. The cardiac support system of claim 1, wherein the electrically insulating coating is Parylene-C.

16. A method for monitoring an integrity of a retaining structure of a cardiac support system, the cardiac support system comprising:
the retaining structure comprising:
an annular ring;
a connection element;
a first electrode disposed at a first annular position along the connection element;
a second electrode disposed at a second annular position along the connection element opposite the first annular position; and
two or more retaining arms extending between the annular ring and the connection element, wherein the two or more retaining arms comprises a first retaining arm extending from the first electrode to the annular ring and a second retaining arm extending from the second electrode to the annular ring;
an electrically insulating coating around the retaining structure configured to electrically insulate the retaining structure from electric charges external to the retaining structure; and
a device configured to monitor the integrity of the retaining structure;
wherein monitoring the integrity comprises:
passing an electrical current from the first electrode through the first retaining arm, the annular ring, and the second retaining arm to the second electrode; and
measuring an electrical property of the retaining structure.

17. The method of claim 16, wherein the device of the cardiac support system comprises at least one actuator-sensor combination, and wherein the method further comprises:
detecting signals of the retaining structure of the cardiac support system with the at least one actuator-sensor combination; and
evaluating the signals to infer the integrity of the retaining structure.

18. The method of claim 17, wherein evaluating the signals comprises conducting a vibration analysis by producing vibrations using sound technology.

19. The method of claim 17, wherein evaluating the signals comprises conducting an impedance analysis to determine an impedance with a coupled current.

20. The method of claim 17, wherein evaluating the signals comprises examining an integrity of electrical conductor tracks placed on the retaining structure.

21. The method of claim 17, wherein evaluating the signals comprises examining an integrity of electrical conductor tracks inserted into the retaining structure.

22. The method of claim 16, wherein the electrically insulating coating is Parylene-C.

* * * * *